US011586614B2

(12) United States Patent
Stamos et al.

(10) Patent No.: US 11,586,614 B2
(45) Date of Patent: Feb. 21, 2023

(54) NATIVE PERSISTENT STORE SUPPORT FOR BLOCKCHAINS

(71) Applicant: Oracle International Corporation, Redwood Shores, CA (US)

(72) Inventors: James W. Stamos, Saratoga, CA (US); Mahesh Baburao Girkar, Cupertino, CA (US); Wei Ming Hu, Palo Alto, CA (US); Juan R. Loaiza, Woodside, CA (US); Sachin Vijaykumar Sonawane, Redwood City, CA (US); Hongjie Yang, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 71 days.

(21) Appl. No.: 16/932,633

(22) Filed: Jul. 17, 2020

(65) Prior Publication Data

US 2021/0034606 A1 Feb. 4, 2021

Related U.S. Application Data

(60) Provisional application No. 62/880,582, filed on Jul. 30, 2019.

(51) Int. Cl.
*G06F 16/23* (2019.01)
*G06F 16/21* (2019.01)
(Continued)

(52) U.S. Cl.
CPC ........ *G06F 16/2379* (2019.01); *G06F 16/211* (2019.01); *H04L 9/0637* (2013.01); *H04L 9/50* (2022.05)

(58) Field of Classification Search
CPC .. G06F 16/2379; G06F 16/211; H04L 9/0637; H04L 2209/38
See application file for complete search history.

(56) References Cited

U.S. PATENT DOCUMENTS 9,589,041 B2  3/2017  Tran et al.
9,747,356 B2  8/2017  Lu et al.
(Continued)

FOREIGN PATENT DOCUMENTS

WO  WO2017/161275  9/2017

OTHER PUBLICATIONS

Ezhilchelvan et al., "Non-Blocking Two Phase Commit Using Blockchain", 1st Workshop on Cryptocurrencies and Blockchains Distributed Systems, CryBlock'18, dated Jan. 1, 2018, pp. 36-41.
(Continued)

*Primary Examiner* — Hares Jami
(74) *Attorney, Agent, or Firm* — Hickman Becker Bingham Ledesma LLP

(57) ABSTRACT

Distributed ledgered data is stored within a distributed persistent storage system comprising multiple persistent storage systems as distributed ledgered participants. In various embodiments, the distributed ledgered data is maintained using the native capabilities of a persistent storage system. The distributed ledgered data is replicated as persistent data objects in a "ledgered repository of objects" that are replicated at each of the persistent storage systems. Changes at one persistent storage system are recorded within a block in a distributed blockchain that is distributed across each of the other distributed ledgered participants. The other distributed ledgered participants read the changes from the blockchain and apply the changes to the respective replicas at each of the other distributed ledgered participants. Hence, this approach is referred to as blockchain apply. Blockchain apply may be used to replicate the repository objects of various forms of PSSs. In a DBMS, a repository of objects is a table, where each record or row is an object in the repository. In a file system, a repository of objects is a directory, where each directory and file therein is an object
(Continued)

in the repository. In a document storage system (DOCS), a repository of objects is a collection of documents, where each document is an object in the repository.

28 Claims, 13 Drawing Sheets

(51) Int. Cl.
   *H04L 9/06* (2006.01)
   *H04L 9/00* (2022.01)

(56) References Cited

U.S. PATENT DOCUMENTS

| | | | |
|---|---|---|---|
| 9,767,178 | B2 | 9/2017 | Srivastava et al. |
| 9,830,372 | B2 | 11/2017 | Rajamani et al. |
| 9,904,722 | B1* | 2/2018 | Shevade ............... G06F 16/283 |
| 10,191,932 | B2 | 1/2019 | Lehouillier et al. |
| 10,616,324 | B1 | 4/2020 | Kaddoura |
| 2002/0095408 | A1 | 7/2002 | Cheng |
| 2014/0379679 | A1 | 12/2014 | Kohno |
| 2016/0224604 | A1 | 8/2016 | Petculescu et al. |
| 2017/0123846 | A1 | 5/2017 | Gschwind et al. |
| 2017/0228371 | A1 | 8/2017 | Seger, II |
| 2018/0096163 | A1 | 4/2018 | Jacques et al. |
| 2018/0152289 | A1 | 5/2018 | Hunt et al. |
| 2018/0374086 | A1 | 12/2018 | Ardashev et al. |
| 2019/0156332 | A1 | 5/2019 | Christidis et al. |
| 2019/0179939 | A1 | 6/2019 | Govindarajan et al. |
| 2019/0238525 | A1* | 8/2019 | Padmanabhan ......... H04L 63/08 |
| 2019/0342149 | A1* | 11/2019 | Guo ..................... H04L 67/1059 |
| 2019/0356674 | A1* | 11/2019 | Irazabal .................. H04L 63/12 |
| 2019/0370793 | A1* | 12/2019 | Zhu ...................... G06Q 20/401 |
| 2020/0050613 | A1 | 2/2020 | Gauvreau, Jr. |
| 2020/0142992 | A1 | 5/2020 | Ocher et al. |
| 2020/0167243 | A1* | 5/2020 | Rauh ................. H04L 63/0823 |
| 2020/0327545 | A1 | 10/2020 | Xie |
| 2020/0364201 | A1 | 11/2020 | Cseri et al. |
| 2020/0374106 | A1* | 11/2020 | Padmanabhan ....... H04L 9/0894 |
| 2021/0014042 | A1* | 1/2021 | Sivathanu ........... G06F 16/9027 |
| 2021/0073209 | A1 | 3/2021 | Loaiza et al. |
| 2022/0035652 | A1 | 2/2022 | Stamos et al. |

OTHER PUBLICATIONS

Cucurull et al., "Distributed Immutalilization of Secure Logs", dated Sep. 17, 2016, Big Data Analytics in the Social and Ubiquitous Context, 16 pages.

Anonymous: "Two-Phase Commit Protocol—Wikipedia", dated Mar. 4, 2019, https://en.wikipedia.org/w/index.php?title=Two-phase_commit_protocol&oldid=886121497, retrieved on Sep. 28, 2020, 10 pages.

Anonymous: "Raft (computer science)—Wikipedia", dated May 2, 2019, https://en,wikipedia.org/w/index.php?title=Raft_computer_science)&oldid=895121718, dated Sep. 28, 2020.

Anonymous: "Learning Key 20c New Features for Database Administrators", Details: Oracle Blockchain Table, dated Feb. 14, 2020, 4 pages.

Wang et al., "Formal Specification and Verification of Smart Contracts in Azure Blockchain", dated Apr. 29, 2019, 13 pages.

Samaniego et al., "Blockchain as a Service for IoT", 2016 IEEE International Conference on Internet of Things (iThings), 4 pages.

Rimba et al., "Comparing Blockchain and Cloud Services for Business Process Execution", dated n 2017, 4 pages.

Ellis et al., "ChainLink A Decentralized Oracle Network", dated Sep. 4, 2017, 38 pages.

Allen et al., "Veritas: Shared Verifiable Databases and Tables in the Cloud", CIDR'19, dated Jan. 2019, CA, 9 pages.

Wikipedia.com, "Two-Phase Commit Protocol", Wikipedia, The Free Encyclopedia, https://en.wikipedia.org/w/index.php?title=two-phase_commit_protocol&oldid=886121497, dated Mar. 2019, 9 pages.

Wikipedia.com, "Raft (Algorithm)", Wikipedia, The Free Encyclopedia, https://en.wikipedia.org/w/index.php?title=raft_(computer_science)&oldid=895121718, dated May 2019, 7 pages.

Loaiza, U.S. Appl. No. 16/923,279, filed Jul. 8, 2020, Non-Final Rejection, dated Apr. 7, 2022.

Loaiza, U.S. Appl. No. 16/923,279, filed Jul. 8, 2020, Notice of Allowance and Fees Due, dated Nov. 16, 2022.

Loaiza, U.S. Appl. No. 16/923,279, filed Jul. 8, 2020, Final Rejection, dated Jul. 26, 2022.

Loaiza, U.S. Appl. No. 16/923,279, filed Jul. 8, 2020, Advisory Action, dated Sep. 29, 2022.

Muzammal et al., "Renovating Blockchain with Distributed Databases: An Open Source System", Future Generation Computer Systems, Jul. 23, 2018, 27 pages.

* cited by examiner

Block Chain Votes 320

| LOG ID | DISTR TXID | COMMIT VOTE |
|---|---|---|
| 2 | 4001 | YES |
| 5 | 4031 | YES |
| 7 | 4057 | NO |
| ... | | |

321

BC Log 103-1

| LOG ID | CONSENSUS ACTIVITY | OUTCOME | BLOCKS |
|---|---|---|---|
| 1 | | ACCEPTED | |
| 2 | | ACCEPTED | |
| 3 | | ACCEPTED | |
| 4 | | ACCEPTED | |
| 5 | | ACCEPTED | |
| 6 | | ACCEPTED | |
| 7 | | ACCEPTED | |

313, 312

Block Chain Transactions 310

| DISTR TXID | LOG ID | STATUS | USER |
|---|---|---|---|
| 4001 | 1 | COMMITTED | ENTA |
| 4005 | 3 | IN FLIGHT | ENTA |
| 4031 | 4 | COMMITTED | ENTB |
| 4057 | 6 | ABORTED | ENTC |
| | | | |

311

| EPOCH ID | EPOCH STATUS |
|---|---|
| 1 | VALID |
| 2 | INVALID |
| 3 | VALID |
| | |

BC Schema 332
- Ledgered Table Definition 333 (includes Column Definitions)
- Block Chain Procedures 105-1
- Participants Definition 334
- Configuration Definition 335
- Active Epoch 336
- Epochs 337
- Private Sub-Schema 340 (Call Back Procedures 342, Views 344)

DB Dictionary 330

FIG. 3

NATIVE PERSISTENT STORE SUPPORT FOR BLOCKCHAINS

RELATED APPLICATIONS; BENEFIT CLAIM

This application claims the benefit of Provisional Appln. 62/880,582, filed Jul. 30, 2019 the entire contents of which is hereby incorporated by reference as if fully set forth herein, under 35 U.S.C. § 119(e).

FIELD OF THE INVENTION

The present invention relates to enterprise-level persistent storage systems, such as a file system, database management systems, key-value store system, document store system, and in particular, implementing blockchain technology natively within an enterprise-level persistent storage system.

BACKGROUND

Traditional persistent storage systems can handle large volumes of data that are read and/or modified by multiple concurrent users. Enterprise-level persistent storage systems (hereafter PSS) maintain data integrity, consistency, and security for the persistent data managed by the PSS.

A PSS may be, for example, a database managed by a DBMS, files stored at a file system, or key-value objects managed by a key-value store system, documents (e.g. JSON documents) managed by a document storage system (DOCS). A PSS stores data in persistent data objects. A persistent data object may be, for example, a database table managed by a DBMS, key-value pairs managed by a key-value store system, documents managed by a DOCS, or a file managed by a file system. A persistent data object may be a composite data object, comprising multiple persistent data objects. For example, in a DBMS, a database table may comprise multiple rows as persistent data objects. In a file system, a file may comprise multiple blocks as data objects, a directory may be a persistent object that contains files and even contains other directories as persistent data objects. In a DOCS, a persistent data object may be a collection of JSON documents.

Various kinds of PSSs, such as DBMSs and key-value store systems, provide superior performance for updating and querying the persistent store. Users of a PSS may rely on the validity of persistent data objects stored in a PSS because changes to the data objects are controlled by a centralized authority such as a company or organization. Generally, any changes made to the data stored in a PSS are made by users belonging to the same central authority and are, therefore, subject to its access policies.

It is becoming increasingly important for separated entities (e.g., businesses, organizations, governments) to share read and write access to mission critical shared data in a way that the entities may rely on the validity of the shared data. Such data is referred to herein as distributed ledgered data.

With traditional PSSs, a system for managing distributed ledgered data may be implemented using a federated approach, which involves multiple traditional PSSs, each of which is controlled by a separate storage system participant that is trusted by the other participants of a federation. Each participant maintains its own replica of the distributed ledgered data in their own private PSS and is trusted by other participants in the federation to make only valid changes to the replicas and communicate such changes to other participants in a trusted manner.

Unfortunately, problems with synchronization can lead to out-of-sync replicas, requiring dispute resolution between participants in the federation and even reversal of transactions, which can be inefficient. Important decisions and operations dependent on the distributed ledgered data may be delayed until the replicas can be reconciled by the participants. Furthermore, participation in the federation is limited to participants that can indeed be trusted and can remain reasonably impervious to malicious attacks on the distributed ledgered data.

Blockchain technology, on the other hand, provides a means for maintaining distributed ledgered data that does not require every participant to be trusted, at least on the same level of the federated approach. Each participant maintains a copy of the distributed ledgered data. Changes to the distributed ledgered data are recorded in a blockchain comprising cryptographically hash-linked blocks. Addition of the blocks is coordinated by the participants using a consensus mechanism to ensure the participants are recording the same changes to the distributed ledgered data. The validity of the distributed ledgered data may be ensured even if some of the participants attempt to corrupt their copies of the distributed ledgered data.

Unfortunately, using blockchain technology to store distributed ledgered data requires forgoing many of the performance benefits offered by many PSSs. To provide the benefits of both blockchain technology and such PSSs, an "off-chain storage" approach may be used. Under the off-chain storage approach, versions of distributed ledgered data are in a PSS and the blockchain is stored in a blockchain store managed by a blockchain application.

The off-chain storage approach makes application development very difficult because the application must manage data in both a PSS and in a blockchain store. Even more difficult is handling roll back operations and recovery operations, both kinds of operations must be performed by the PSS and a blockchain store.

Based on the foregoing, an approach that facilitates managing distributed ledgered data that may be stored and accessed within a PSS is desirable.

BRIEF DESCRIPTION OF THE DRAWINGS

In the drawings:

FIG. 3 is a diagram depicting data structures used in an embodiment of the present invention.

DETAILED DESCRIPTION

Figure 1A:
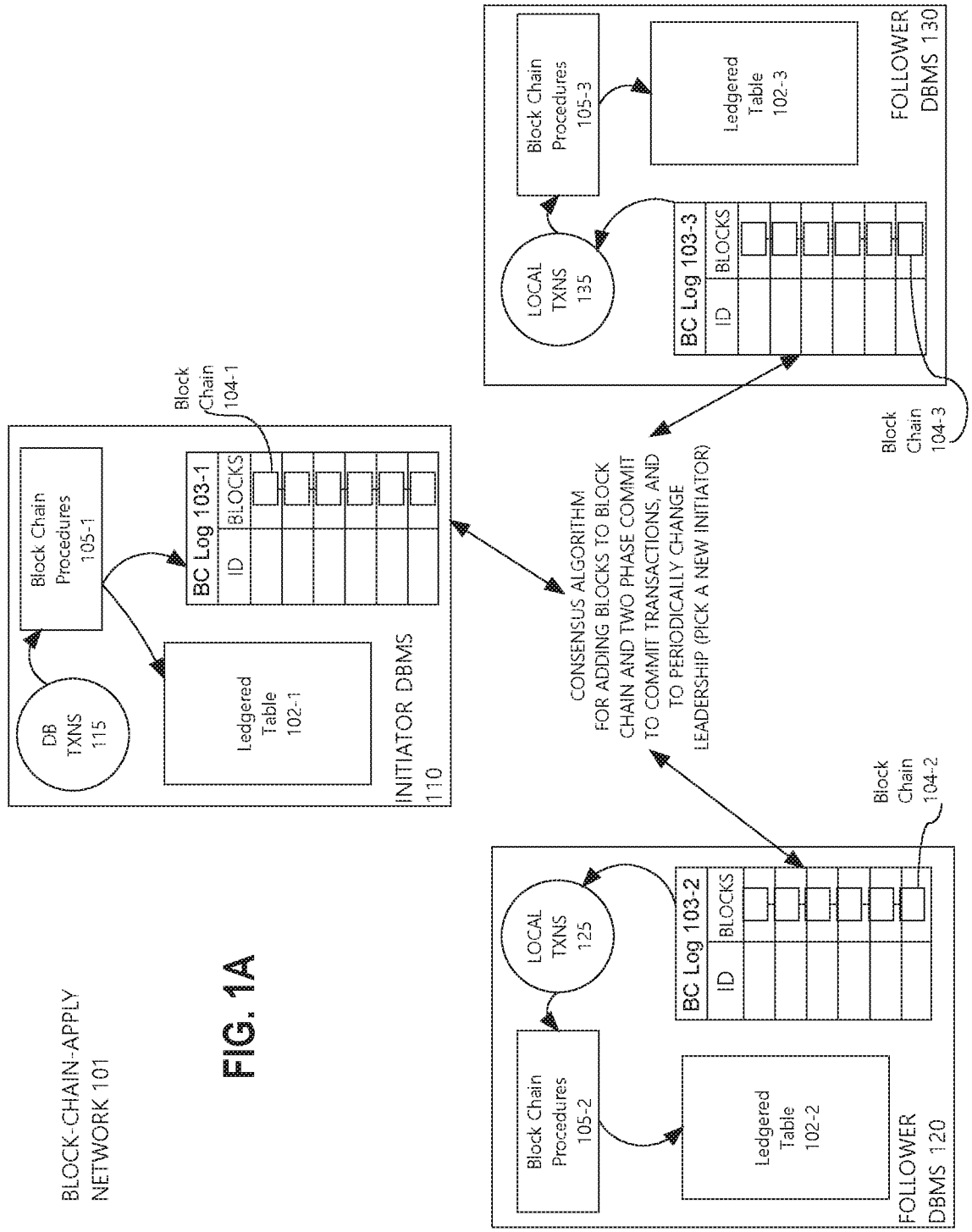
FIG. 1A is a diagram depicting a blockchain apply network according to an embodiment of the present invention.

In the following description, for the purposes of explanation, numerous specific details are set forth in order to provide a thorough understanding of the present invention. It will be apparent, however, that the present invention may be practiced without these specific details.

General Overview

Described herein is an approach for maintaining distributed ledgered data within a replicated PSS comprising multiple PSSs as distributed ledgered participants. In various embodiments, the distributed ledgered data is maintained using the native capabilities of a PSS. The distributed ledgered data is replicated as persistent data objects in a "ledgered repository of objects" that are replicated at each of the PSSs. Changes at one PSS are recorded within a block in a distributed blockchain that is distributed across each of the PSSs. Other PSSs read the changes from the blockchain and apply the changes to the respective replicas at each of the other PSSs. Hence, the approach is referred to as blockchain apply.

Blockchain apply may be used to replicate the repository objects of various forms of PSSs. In a DBMS, a repository of objects is a table, where each record or row is an object in the repository. In a file system, a repository of objects is a directory, where each directory and file therein is an object in the repository. In a document storage system (DOCS), a repository of objects is a collection of documents, where each document is an object in the repository.

Transaction Processing

In transaction processing, changes to persistent data objects are made by transactions. A transaction is a set of operations that change persistent data objects. All the changes for a transaction are made atomically. The changes are made permanent by committing the transaction. If the transaction cannot be committed, or is aborted or otherwise not committed, the transaction is rolled back.

In a distributed transaction processing, multiple PSS participants commit a distributed transaction to change respective data objects using a phased approach that is managed by a transaction manager. The phased approach includes at least a phase in which the participants reach a prepared state. When in a prepared state for a transaction, the participant has performed the operations needed to reach a state where the participant can guarantee to be able to commit the transaction but has not yet committed the transaction. A participant may be instructed to reach the prepared state by the transaction manager and communicate to the transaction manager whether the participant has reached the prepared state.

Transaction processing, as the term is used herein, also requires journaling. In journaling, changes made by a transaction to a persistent data object are stored in a persistent journal. A persistent journal comprises journal records that record changes made by a transaction to a data object. Each record may specify what field, column, elements, or portion of a data object were changed and the new values thereof created by the change. The old values that were replaced by the new value may also be specified.

In write-ahead journaling, journal records for changes made by a transaction are stored persistently before committing a transaction and/or to reach a prepared state. In addition, the journal can be read by other PSS to replicate persistent data objects.

Blockchain Apply in a Replicated DBMS

Blockchain apply is initially described within the context of a DBMS. However, blockchain apply may be used in other types of PSSs that have the capability to make changes using distributed transaction processing.

In the context of a DBMS, distributed ledgered data is maintained as a distributed database table using the native capabilities of a DBMS. The distributed database is replicated at each of the DBMSs. Changes at one DBMS are recorded within a block in a distributed blockchain that is distributed across each of the DBMSs. A DBMS reads the changes from the blockchain and applies the changes to the respective replicas of the distributed database tables.

A distributed database table that is replicated using this approach is referred to herein as a ledgered table. The term ledgered table does not imply a ledger that is an append-only data structure. The ledgered table may be any database table. The set of multiple DBMSs that each participate in blockchain apply to replicate a particular ledgered table are collectively referred to herein as a blockchain apply network ("BCA network"). Each DBMS in the BCA network may simply be referred to herein as a DBMS participant. The changes that can be replicated using blockchain apply include DML (Database Manipulation Language) changes, which are changes that change data in the ledgered table or DDL (Database Definition Language) changes, which include changes that change a database dictionary to effect a change to a BCA network, including a structure of a ledgered table.

In blockchain apply, a feature of a blockchain is chain-state consensus, which means that the participants have agreed (through a consensus protocol) to what the state and state changes of the blockchain are. Chain-state consensus is leveraged under blockchain apply. In blockchain apply, a blockchain records changes to a ledgered table. In effect, the blockchain represents the state of the ledgered table and the respective replicas. Because the participants have agreed to what the state of a blockchain is, the participants have agreed to what the state of the ledgered table is, and have agreed to what state changes to the ledgered table there are.

According to an embodiment, any change to a ledgered table must be initiated by a leader of the BCA network, referred to as an initiator DBMS. The ledgered table and blockchain are distributed. Thus, a replica of the ledgered table and blockchain is maintained at each of the DBMS participants. The initiator DBMS coordinates updating the replicas of the ledgered table and blockchain with the other DBMS participants, which are referred to herein as follower DBMSs. DBMS participants alternate the role of initiator DBMS on a frequent and/or regular basis, with the initiator DBMS switching from the role of initiator DBMS to follower DBMS.

The DBMS participants have been configured by, for example, database administrators of each of the respective DBMS participants, to participate in the BCA network to update the distributed table. A change to the ledgered table may be initiated by a database application client by simply issuing a DML statement to the initiator DBMS through a database session established with the initiator DBMS.

According to an embodiment, blockchain apply applies changes to a ledgered table and respective blockchain by performing a variant of a two-phase commit. In the first phase, the prepare-to-commit phase, a block specifying the changes is added to the blockchain at each of the DBMS participants, who then enter the prepare-to-commit state for the data changes to the replicas of the ledgered table. In the second phase, the DBMS participants add a block recording the outcome of the commit decision and commit or abort the changes accordingly. The DBMS participant uses a log-based consensus algorithm to control whether blocks are added to the blockchain.

In general, in a consensus algorithm, participants in the consensus algorithm reach a consensus on whether to accept the proposals and then act upon the proposal when the consensus is to accept the proposal. A proposal may be to add a proposed block to a blockchain, a proposed log record (which includes a block) to a log, or to take another kind of action.

In a log-based consensus algorithm, participants reach a consensus on appending log records to a log, and in particular, on the order in which the log records are appended and what the content of each log record should be. A replica of the log is maintained by each of the participants. In blockchain apply, each log record stores a block in the blockchain and the order of the block in the blockchain mirrors the order of the log records. Log-based consensus algorithms are explained in greater detail later.

Blockchain apply is implemented as a native feature of a DBMS. A blockchain network is created and configured by issuing DDL commands to each DBMS participant. Changes to a ledgered table and associated blockchain are integrated into the native transaction and replication capability of a DBMS, including the capability to replicate the changes in parallel. Performance can be monitored using available DBMS tools. Database applications may be programmed to read and write to ledgered tables in the same way the applications are configured to read and write to traditional tables. No external data structures (i.e. external to a DBMS) are needed to implement a ledgered table and its associated blockchain.

Illustrative BCA Network

FIG. 1A depicts a BCA network 101 according to an embodiment of the present invention. Referring to FIG. 1A, BCA network 101 includes initiator DBMS 110 and follower DBMS 120 and follower DBMS 130. Each of these DBMSs participates in maintaining a distributed ledgered table which is securely updated through a protocol for appending blocks to a distributed blockchain. Changes to a distributed ledgered table are initiated at and by initiator DBMS 110.

As mentioned previously, BCA participants rotate the role of initiator DBMS. Thus, FIG. 1A represents the roles of the BCA participants at a particular point in time. At another point in time, follower DBMS 120 or follower DBMS 130 may be an initiator DBMS of BCA network 101. Switching the role of the initiator DBMS among BCA participants is referred to herein as switching leadership, with the initiator DBMS that is switching to the role of follower DBMS being referred to as losing leadership and the new initiator DBMS being referred to herein as gaining leadership. An initiator DBMS retains leadership for a leadership term.

BCA Data Structures

Figure 1B:
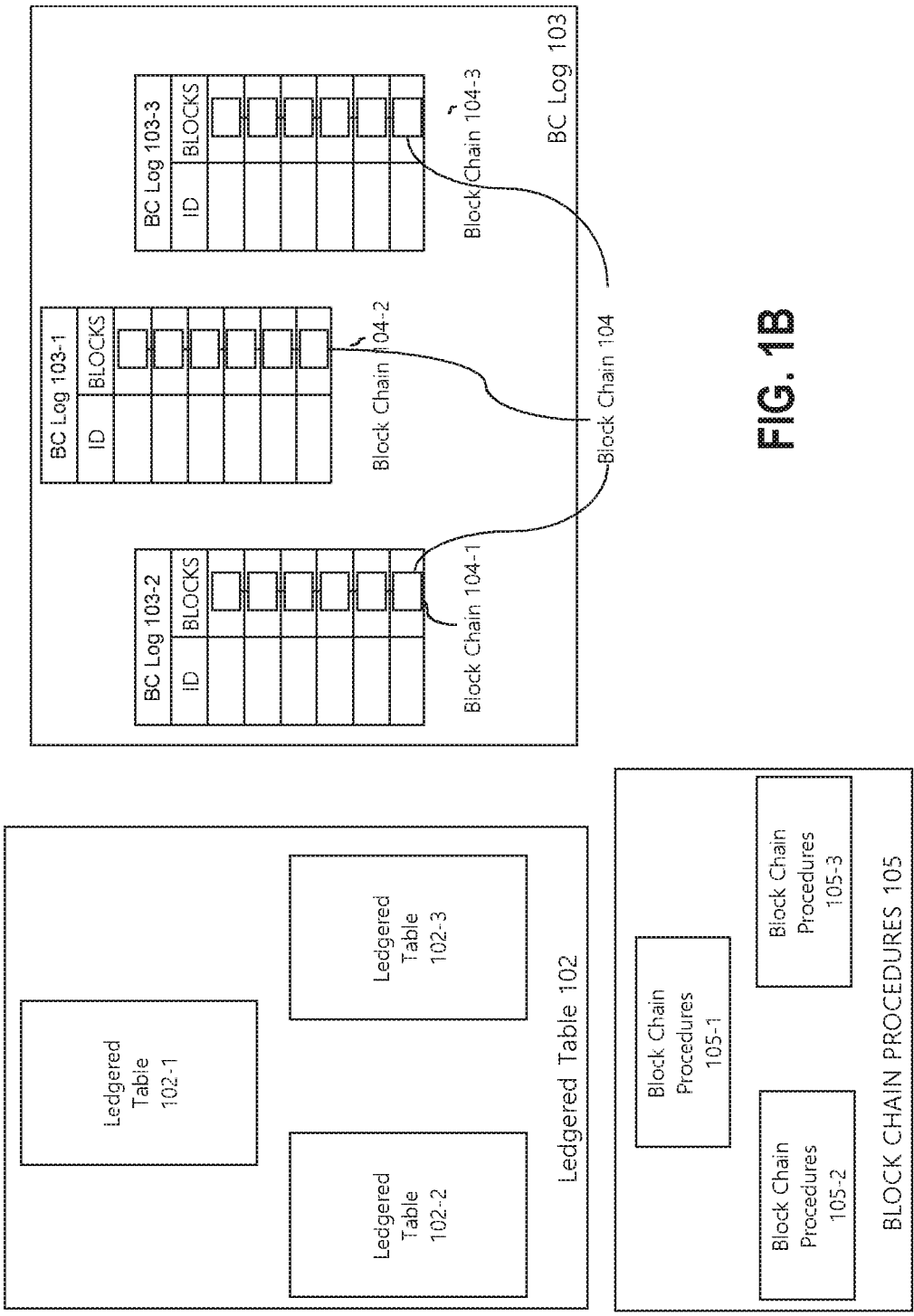
FIG. 1B is a diagram depicting data structures used in an embodiment of the present invention.

FIG. 1A illustrates various data structures that are distributed as replicas across BCA network 101. FIG. 1B depicts constituent replicas of these distributed data structures, which are described further below.

Referring to FIGS. 1A and 1B, BCA network 101 includes distributed ledgered table 102 (see FIG. 1B), which is comprised of replicas that are stored as ledgered table 102-1, ledgered table 102-2, and ledgered table 102-3 on initiator DBMS 110, follower DBMS 120, and follower DBMS 130, respectively. (see FIG. 1A)

Distributed blockchain 104 comprises replicas of the distributed blockchain, which are blockchain 104-1, blockchain 104-2, and blockchain 104-3. These blockchain replicas are stored on initiator DBMS 110, follower DBMS 120, and follower DBMS 130, respectively.

Blockchains 104-1, 104-2, and 104-3 are stored in a distributed blockchain log ("BC log") BC Log 103, which comprises BC log 103-1, BC log 103-2, and BC log 103-3, and which are stored on initiator DBMS 110, follower DBMS 120, and follower DBMS 130, respectively. According to an embodiment, a BC log is a database table that includes at least one column for storing a blockchain, each row (BC log record) of the BC log storing a block of the blockchain.

BC log 103-1, BC log 103-2, and BC log 103-3 comprise distributed BC log 103, and each contains replicas of the log records of BC log 103. Each log record includes a log identifier (log ID), which uniquely identifies the log record in BC log 103. Each replica of a log record includes the same log ID. Log IDs are ordered such that the log ID of a log record is greater than that of any other log record that holds an earlier block in the blockchain stored in the ledger.

In an embodiment, log IDs in a BC log are monotonically increasing number values, such as an integer. With respect to a blockchain stored in the BC log, the log ID of a log record in the BC log represents the block position of the block contained in the log record, where the block position is the position of the block in the blockchain. For example, a log record having a log ID 0 stores the genesis block in the respective blockchain, a log record having log record ID 1 stores the second block in the respective blockchain, and so forth.

BCA network 101 also includes a distributed set of blockchain procedures 105. A blockchain procedure is a computer executable procedure or function, the implementation of which is accepted by and visible to a member of BCA network 101, and which is executed by a member of BCA network 101 to modify a ledgered table. According to an embodiment, the blockchain procedures may be implemented in a database computer language, such as PL/SQL, or other languages, such as Java, Java Script, Python, or Solidity. Blockchain procedures 105 comprise replica blockchain procedures 105-1, blockchain procedures 105-2, and blockchain procedures 105-3, which are stored on initiator DBMS 110, follower DBMS 120, and follower DBMS 130, respectively.

A BCA network client may request changes to a ledgered table by initiating database transactions 115 with initiator DBMS 110, through which the client may issue database statements to change Ledgered Table 102-1. Issuing the database statements initiates database transactions 115.

The database statements may invoke a blockchain procedure, passing argument values for arguments of the blockchain procedure. Alternatively, the database statements may directly specify DML operations of the distributed ledgered table.

As shall be explained in greater detail, initiator DBMS 110 initiates distributed transactions to replicate the DML operations across BCA network 101. The changes are replicated by replicating log records at follower DBMSs 120 and 130. Initiator DBMS 110 coordinates with follower DBMSs 120 and 130 to add log records to distributed BC log 103. Adding log records in effect adds blocks to distributed Blockchain 104. Using distributed transaction processing coordinated by initiator DBMS 110, local transactions 125 and local transactions 135 executing within follower DBMS 120 and follower DBMS 130 apply the changes specified in the log records to ledgered table replicas ledgered table 102-2 and ledgered table 102-3, respectively.

A DBMS may be a DBMS participant in multiple different BCA networks. As shall be explained in greater detail, the database dictionary of each DBMS participant in the BCA network defines the BCA network and its constituent components and configuration.

Log-Based Consensus Algorithms

According to an embodiment, BCA network 101 uses a log-based consensus algorithm that is initiator-based to control whether DBMS participants add log records to the distributed BC log or whether the DBMS participants should undertake other kinds of actions. In general, a log-based consensus algorithm that is initiator-based requires an initiator DBMS to make proposals to follower DBMSs to append log records to a log and to manage consensus among the participant DBMSs on whether to accept the proposals.

In an initiator-based log-based consensus algorithm, participants in a BCA network follow an election protocol periodically to elect an initiator DBMS for a leadership term. Leadership terms are not necessarily for the same duration and the elections do not necessarily occur at fixed intervals. At any given time for the BCA network, there is only one active leadership term ("current leadership term") and one initiator DBMS. Each leadership term is identified by a "term ID", which is a value from an ordered domain of values (e.g., integers) that uniquely identifies a leadership term and the order in which the leadership term occurred relative to other leadership terms. For example, the term IDs 1, 2, 3 uniquely identify three consecutive leadership terms.

Initiator-based consensus protocols entail that the initiator DBMS frequently send different kinds of messages to each of the other participant DBMSs. Such messages include messages to propose log records and heartbeat messages. These messages may include a common "piggybacked payload", which contains fields that communicate information about the state of the BCA network at the time the message is sent. A piggybacked payload includes the term ID of the leadership term under which the initiator DBMS sent a message. The piggybacked payload may include other kinds of information, as shall be later explained.

In response to the initiator DBMS sending a message to propose a log record, the other DBMS participants determine to accept or reject the proposal and communicate the determination to the initiator. The one or more criteria that govern a DBMS participant's acceptance of a proposal is referred to herein as proposal-acceptance criteria. The proposal-acceptance criteria may include, for example, that a proposed log record includes a valid block to add to a blockchain, or that the term ID in the piggy-backed payload of the message proposing the log record is that of the current leadership term.

The DBMS participants determine whether the proposal was accepted or rejected based on one or more consensus criteria, which is based at least in part on how many of the DBMSs participants accept or reject the proposal. The determination is referred to herein as the consensus outcome. An example of consensus criteria is that a quorum of the DBMS participants accepts a proposed log record. The initiator DBMS communicates the consensus outcome to the other DBMS participants, as shall be described in further detail. Alternatively, a decentralized communication pattern may be used to determine the consensus outcome.

A DBMS participant communicates acceptance of a proposal. In an embodiment, a DBMS participant sends a digitally signed message to the initiator DBMS participant that specifies that the DBMS participant accepts or rejects the proposal.

When accepted is the consensus outcome for adding a log record to a BC log, for adding a block to a blockchain, or for taking any other kind of action, the log record, blockchain, or other action are referred to as accepted. When rejected is the consensus outcome for adding a log record to a BC log, for adding a block to a blockchain, or for taking any other kind of action, the log record, blockchain, or another kind of action are referred to as rejected.

As a point of clarification, in an initiator-based log-based consensus algorithm, follower DBMSs do not accept or reject log records, but instead accept or reject proposed log records. The initiator DBMS accepts or rejects log records on behalf of the BCA network by determining the consensus outcome. When a log record is accepted in this way, the log record and block therein are referred to herein as being added or appended to the BC log or blockchain, respectively.

Example log-based algorithms include Raft and Paxos. An example of Raft is described in *In Search of an Understandable Consensus Algorithm*, by Diego Ongaro and John Ousterhout, Stanford University, June 2014, the entire contents of which are incorporated herein by reference. An embodiment of the present invention is not limited to any particular consensus algorithm. A consensus algorithm that is used to determine whether a log record is accepted or rejected for a log or to add a block to a blockchain is referred to herein as a blockchain consensus algorithm.

Log IDS

A log ID is an identifier from an ordered domain of values (e.g., integers) that uniquely identifies an accepted log record in a BC log. The order is referred to herein as the log ID order. Within a BC log, the log ID of a log record is unique with respect to the log IDs of other accepted log records.

The log ID of a log record reflects the order in which the log record is accepted. The log ID of the first log record accepted is next followed by the log ID of the second log record accepted, and so forth.

A proposal to add a log record includes a proposed log ID. The log ID of an accepted log record is referred to as being an accepted log ID. A follower DBMS does not accept a proposal to add a log record unless the respective proposed log ID is the next log ID in the log ID order following that of the last accepted log record.

An initiator DBMS may issue multiple proposals before any of the proposals are accepted by a BCA network. A follower DBMS only accepts proposals in the order of the proposed log ID order. Thus, a follower DBMS may defer accepting a proposed log record until the follower DBMS learns that the consensus outcome for a log record with the most previous log ID is accepted.

Communicating Acceptance/Rejection of Blocks by Participants

According to an embodiment, consensus outcome for one or more blocks is signaled through a global log ID watermark ("watermark") communicated by an initiator DBMS in piggybacked payloads. Any log ID is less than or equal to the watermark is treated by a participant DBMS as having a consensus outcome of accepted. When an initiator DBMS determines the consensus outcome for a proposed log record is accepted, the initiator DBMS will adjust the watermark to the log ID of the proposal, so long as the consensus outcome for any proposal with a previous log ID is accepted. When a participant DBMS determines the log ID of a proposed log record is covered by the watermark (i.e. is less than or equal to the watermark), the participant DBMS assumes that the consensus outcome for the log record is accepted.

It is possible that a participant DBMS may receive one or more other proposed log records with the same log ID of a previously proposed log record. In this situation, when a participant learns that the consensus outcome of one of the proposed log records is accepted, the participant may discard any of the other proposed log records. It should be noted that a local watermark maintained by the participant should not cover the log ID at this point, as the previous proposed log record should not have been accepted.

Additional Terminology for Consensus Driven Action

Various operations by BCA network 101 or any of its constituents are described as performing an action according to or by using a consensus algorithm. A consensus algorithm entails that the participants in the algorithm follow a protocol for the algorithm, which may require such steps as an initiator DBMS transmitting a proposal (e.g. proposed log record and log ID), other DBMS participants receiving the proposal and responding to the proposal by voting to accept or reject the proposal, the initiator DBMS determining the consensus outcome based on the votes received according to the log-based consensus protocol, and then the initiator DBMS transmitting the consensus outcome to the participants. When voting, accepting, rejecting, or when an operation is described as being performed according to or by using a consensus algorithm, it may be assumed that participants perform actions required by and according to the protocol.

A proposal has a proposal status which indicates the progress in determining the consensus outcome for the proposal. Until a consensus outcome is determined for a proposal, the proposal status is pending, and the proposal is referred to herein as being pending. When a consensus outcome has been determined for a proposal, the proposal status is resolved, and the proposal is referred to herein as being resolved.

As shall be explained in greater detail, BCA participants follow a consensus algorithm to determine whether to commit a distributed transaction. The consensus outcome for committing the distributed transaction is referred to as a commit consensus outcome. The acceptance or rejection of a proposal to commit a distributed transaction by a follower DBMS is referred to herein a vote to commit or not to commit, respectively.

Blockchain Apply Replication Overview

Figure 2:
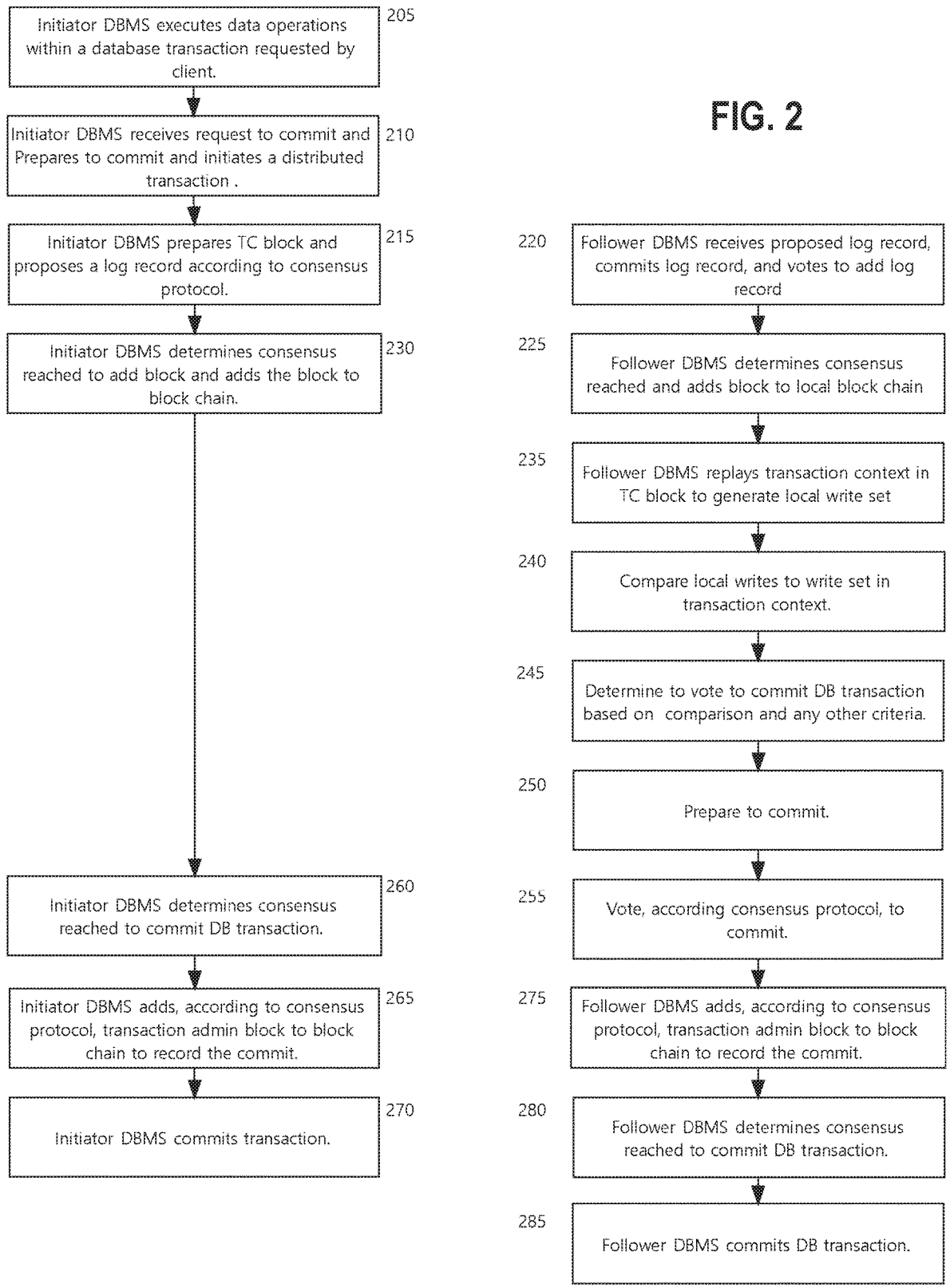
FIG. 2 is a diagram depicting blockchain apply procedure according to an embodiment of the present invention.

FIG. 2 is a flowchart depicting blockchain apply according to an embodiment of the present invention. The procedure is referred to as a DML blockchain apply procedure because the procedure replicates DML changes to a ledgered table across a BCA network.

The flowchart depicts the normal course of operations where DML changes made by transactions are replicated using blockchain apply without encountering error conditions or exceptions. Handling error conditions and exceptions are explained later. The operations are performed by initiator DBMS 110 and follower DBMS 120 & 130 in response to a transaction initiated by a database client that has established a database session with initiator DBMS 110.

Referring to FIG. 2, initiator DBMS 110 executes database operations within the initiated database transaction against ledgered table 102-1 (205). Such database operations include execution of one or more database statements, including DML statements and one or more blockchain procedures of blockchain procedures 105. The database operations may include save points, or even rollbacks.

Initiator DBMS 110 receives from the client a request to commit the database transaction. In response, initiator DBMS 110 initiates a distributed transaction and prepares to commit the distributed transaction as part of a two-phase commit and becomes prepared to commit. (210)

A distributed transaction changes a database in each of multiple participating DBMSs. The changes at each participating DBMS are made by a local transaction initiated and/or executed by a participating DBMS to change data at the participating DBMS as part of the distributed transaction. The initiator ("coordinator DBMS") assigns a distributed transaction id ("distributed txid"). The local transaction is referred to as a branch transaction of the distributed transaction. Each DBMS assigns a local transaction id to the respective branch transaction and associates the local transaction id with the distributed txid.

The execution, commitment, and termination of the distributed transaction is coordinated by the initiator DBMS. According to an embodiment, a distributed transaction is executed using the distributed transaction protocol specified in the X/Open XA specification. Under this protocol, an initiator DBMS is a transaction manager of the distributed transaction.

Initiator DBMS 110 prepares and commits a proposed log record with a proposed log ID for BC log 103-1. The proposed log record is committed in a separate local transaction, even though not yet accepted by the follower DBMSs, for purposes of recovery, as shall be explained in greater detail. In accordance with the blockchain consensus algorithm, initiator DBMS 110 proposes to add the log record to BC log 103 to follower DBMS 120 and 130. The proposed log record includes a proposed TC block (transaction context block) to add to distributed blockchain 104, along with a proposed log ID.

A TC block includes a transaction context. A transaction context includes a specification of the database operations executed for a branch transaction by the initiator DBMS and the write set of the one or more rows resulting from executing these database operations. The write set in the proposed TC block is referred to herein as a proposed write set. The TC block may include other information, such as the distributed txid for the distributed transaction.

The specification of the database operations may include the input argument values for one or more blockchain procedures that were executed by the database operations. Execution of the one or more blockchain procedures may cause execution of one or more database statements that are not listed explicitly in the specification.

As shall be described later, follower DBMS 120 and 130 replay the transaction context (i.e., execute the sequence of database operations specified by the specification in the transaction context without committing the database operations) within a branch transaction initiated by follower DBMS 120 and 130 to generate a local write set. A comparison of the local write set with the proposed write set determines, at least in part, whether follower DBMS 120 and 130 will vote to commit the distributed transaction.

Follower DBMS 120 and 130 receive the proposed log record and accept the proposed log record. Follower DBMS 120 and 130 insert and commit the proposed log record for BC log 103-2 and 103-3, respectively (220).

Initiator DBMS 110 determines, according to the blockchain consensus algorithm, that the block consensus outcome for the proposed log record is accepted. In response, initiator DBMS 110 updates the log record to indicate acceptance thereof and sends a message to follower DBMS 120 and 130 to inform that the consensus outcome is accepted (230). Sending a message may include updating the global watermark by piggybacking onto messages transmitted by the initiator DBMS as explained earlier. Upon learning the consensus outcome for the proposed log record is accepted, follower DBMS 120 and 130 then determine that the block consensus outcome is accepted, and in response, update the proposed log record in BC log 103-2 and 103-3, respectively, to indicate acceptance. Updating the log record in this way by initiator DBMS 110 and follower DBMS 120 and 130 in effect adds the TC block to blockchain 104-1, 104-2 and 104-3, respectively.

Next, follower DBMS 120 and 130 initiate a local transaction (separate from that used to commit the log record) to replay the transaction context in the TC block to generate a local write set (235). The local write set is compared to the proposed write set (240).

Follower DBMS 120 and 130 determine to vote to commit the proposed database transaction based on a comparison of the local write set to the proposed write set (245). Generally, in determining whether to vote to commit the distributed transaction, a follower DBMS 120 and 130 determines whether one or more DML commit criteria are satisfied. DML commit criteria include whether the proposed write set matches the local write set, and if so, whether one or more other criteria, if any, are satisfied. Rows of a write set should include the primary key of the ledgered table or a similarly unique identifier to ensure replicas of the same rows can be matched for comparison.

Next, follower DBMS 120 and 130 prepare to commit the proposed DB transaction (250). After preparing to commit, follower DBMS 120 and 130 vote to commit the distributed transaction (255).

Initiator DBMS 110 determines a commit consensus outcome for committing the distributed transaction according to a consensus algorithm, which may be different than the blockchain consensus algorithm (260). Initiator DBMS 110 then generates a log record that includes a TA block (transaction administration block) and commits the log record to BC log 103-1 in a separate local transaction (265). A TA block includes information about the outcome of the distributed transaction, including whether a distributed database transaction was committed or not, and the votes of the follower DBMSs.

The log record for the TA block is then proposed to follower DBMS 120 and 130, and then follower DBMS 120 and 130 accept the proposed log record, committing the log record to BC log 103-2 and 103-3, respectively. In response to determining that the block consensus outcome for the log record is acceptance, initiator DBMS 110 updates the log record to BC log 103-1 to specify that the block consensus outcome for the log record is acceptance, and commits the distributed transaction and the respective local transaction (270). In response to initiator DBMS 110 transmitting to follower DBMS 120 and 130, a message that the block consensus outcome for the log record is acceptance, follower DBMS 120 and 130 update the log record in BC log 103-2 and 103-3, respectively, to specify acceptance of the log record. (275)

In response to updating the log record, follower DBMS 120 and 130 read the TA block therein to determine from the TA block that the commit consensus outcome for the distributed transaction is accepted (280). In response, follower DBMS 120 and 130 then commit their respective local transactions (285).

Adding Log Record or Block—Clarified

As shown above, adding a log record to a BC log or a block to a blockchain involves various operations. These operations can include an initiator DBMS inserting a log record into a BC log, proposing the log record to follower DBMSs, the follower DBMSs voting to accept the proposal, the initiator DBMS determining a block consensus outcome and communicating the block consensus outcome to the follower DBMSs, and modifying the BC log to effect block consensus outcome. For purposes of exposition, adding a log record or block is described without specifying any or all these various operations. It should be understood, however, such operations are being performed as part of adding the log record or block even though such operations are not specifically mentioned.

Secure Communication Between DBMS Participants and Clients

Initiator DBMS 110 and follower DBMS 120 and 130 may be connected over a Wide Area Network, which may be public or private. In general, messages are transmitted between these DBMSs using a secure network communication protocol. In addition, the message may contain content digitally signed by the initiator or transmitter of the message to authenticate that the content originated from the initiator or transmitter.

Block-chain apply can be used between DBMS participants and database clients in limited or no trust environments. To allow DBMS participants to participate securely in a BCA network, each DBMS participant runs a proxy server. Messages transmitted as part of block apply are transmitted to the proxy server using for example, the HTTPS protocol. Using a proxy server avoids the need for one database to connect to another database directly, which may not be permitted in a deployment with minimal trust.

Parallism in Blockchain Apply

In effect, the replay of a transaction context by a follower DBMS is in various respects a replication operation that applies DML changes specified in a transaction context. Parallel replication techniques may be used to apply the DML changes. In general, parallel processing of DML changes within a transaction involves execution of the respective portion of the DML changes by each of one or more multiple slave processes.

In fact, follower DBMSs in a BCA network may be each executing local transactions to generate write sets for multiple uncommitted distributed transactions for which TC blocks have been added. In this situation, it is possible that among these local transactions, a "dependent" local transaction may include a DML change that is transactionally dependent on the commit of an earlier local transaction. Enforcing transactional dependency may require deferring both the application and commitment of the DML change until the commitment of the earlier transaction. Block-chain apply should apply and commit the DML change in this way.

Use of parallel replication techniques in blockchain apply causes deferring the application of the DML change in the dependent local transaction. A BCA participant cannot unconditionally complete generating the local write set of the dependent local transaction, much less unconditionally vote to commit the respective distributed transaction, until the earlier local transaction is committed or guaranteed to commit.

Supplemental Data Structures for Blockchain Apply

FIG. 3 depicts in greater detail data objects used to support blockchain apply for a ledgered table, according to an embodiment of the present invention. Referring to FIG. 3, it depicts BC log 103-1, and tables Blockchain Transactions 310 and Blockchain Votes 320, which are data objects used to support blockchain apply on DBMS 110 for ledgered table 102-1.

BC log 103-1 contains columns and multiple rows, i.e., log records. Each log record includes, in column BLOCKS, a block in Blockchain 104-1. In addition, each log record includes, in column LOG ID, a log ID for the log record. Each log record in BC log 103-1 specifies a block consensus outcome. Information about the block consensus outcome is stored in column OUTCOME.

Information about the DBMS participants and their part in the block consensus outcome for a block is stored in column CONSENSUS ACTIVITY. For a row in BC log 103-1, CONSENSUS ACTIVITY may identify the initiator DBMS, follower DBMSs, and the respective acceptance or rejection of the block.

Blockchain Transactions 310 and Blockchain Votes 320 may contain information that is redundant of that stored in BC log 103-1, but which may store such information in a way that is more accessible. Blockchain Transactions 310 and Blockchain Votes 320 are used for informational and auditing purposes.

Blockchain Transactions 310 stores information about transactions executed against Ledgered table 102-1. Each row in Blockchain Transactions 310 includes in column DISTR TXID, a distributed txid identifying a distributed transaction executed against Ledgered Table 102-1, in column LOG ID, a log ID of the respective TC block of the distributed transaction, in column USER, a user identifier of the user that issued the distributed transaction, and in column STATUS, the transaction status of the distributed transaction. The status of a distributed transaction may include when or whether the transaction is committed or aborted, or is in-flight.

For example, row 311 records information about a distributed transaction. DISTR TXID contains 4001 as the distributed txid of the distributed transaction, LOG ID stores log ID 1 which identifies the log record 313 as storing the TC block for the distributed transaction, STATUS stores the transaction status of the distributed transaction specifying that the distributed transaction is committed, and USER stores the user identifier ENTA identifying the user that initiated the distributed transaction.

Blockchain Votes 320 includes information about the commit consensus outcome with respect to log records in BC log 103-1 for TA blocks. Each row in Blockchain Votes 320 includes voting information about a respective log record in BC Log 103-1. Column LOG ID includes the log ID of the respective log record. DISTR TXID includes a distributed txid of the distributed transaction for which the block is added. Column COMMIT VOTE describes the votes of each DBMS participant for the commit consensus outcome. The specific DBMS participants may be kept in Blockchain Votes 320, or they may be determined by examining the corresponding log record in BC Log 103-1.

For example, row 321 records a commit consensus outcome for the TA block stored in log record 312. In Blockchain Votes 320, LOG ID stores the log ID 2 identifying log record 312, DISTR TXID includes a distributed txid 4001 of the respective distributed transaction of log record 312, and COMMIT VOTE specifies the voting outcome for the distributed transaction 4001.

Blockchain Transactions 310 and Blockchain Votes 320 may be used to retrieve information about the current state of operations affecting a ledgered table and the respective blockchain and about the activity of the DBMS participants in BCA network 101. While such information may be derived from BC log 103-1, storing such information in Blockchain Transactions 310 and Blockchain Votes 320 facilitates more efficient retrieval of the information. For example, to determine the status of a distributed transaction, the distributed txid may be used to retrieve the status of the transaction from column STATUS.

Database Dictionary for Block-Chain Apply Network

A database dictionary comprises metadata that defines database objects of a DBMS and other configuration aspects. A database dictionary may comprise multiple data structures that store database metadata. A database dictionary may, for example, comprise multiple files and tables. Portions of the data structures may be cached in main memory of a database server.

A subset of the metadata that defines a particular database object of the DBMS or a particular aspect of the configuration of the DBMS is referred to herein as a metadata definition or simply definition. A definition may also include multiple data structures and tables. A definition of a particular database object may include definitions of constituent data objects. For example, a definition of a table may include multiple definitions of the table's columns.

A database dictionary for a DBMS participant includes a blockchain schema ("BC schema"). A BC schema is a named collection of definitions of database objects and one or more configurations of a BCA network. A BCA defines a ledgered table, blockchain procedures for the ledgered table, if any, supplemental database objects, and DBMS participants in the BCA network. A BC schema may be created by a DBMS in response to DDL database statements specifying definitions for various aspects of the BC schema.

Referring to FIG. 3, it depicts DB Dictionary 330, a database dictionary of initiator DBMS 110. DB Dictionary 330 includes BC schema 332, which includes Ledgered Table Definition 333, which defines Ledgered Table 102-1 (and its columns) and database objects dedicated to supporting blockchain apply of Ledgered Table 102-1 within BCA network 101, as well as aspects of the configuration of BCA network 101 particular to Ledgered Table 102-1.

Blockchain Procedures 105-1 defines blockchain procedures for Ledgered table 102-1. The definitions may include source code for the procedures and/or compiled versions thereof. According to an embodiment, a blockchain procedure is associated with only one BCA network and hence may be used to update one or more ledgered tables of the BCA network. Participants Definition 334 defines the DBMS participants of BCA network 101. Such information may include a network address and public encryption keys for the DBMS participants.

Blockchain Configuration 335 includes configuration details about the distributed blockchain maintained for Ledgered Table 102-1. Such information may include, for example, a "block hash algorithm" for generating block hash values for a block in the blockchain, as shall be described later, and an encryption algorithm for digitally signing content to include in a block.

Finally, FIG. 3 is representative of database objects and data structures on follower DBMS 120 and 130 that are used to support blockchain apply. Thus, follower DBMS 120 and 130 each have a blockchain votes table, blockchain transactions table, a DB dictionary, and BC schema that defines counter-part database objects that are similar or identical in structure to Blockchain Votes 320, Blockchain Transactions 310, DB Dictionary 330, BC schema 332, respectively. In addition, BC log 103-2 and 103-3 are structured the same or similarly as BC Log 103-1.

Private Sub Schema and Callback Procedures

A BC schema may include a private BCA subschema that is not replicated and distributed across a BCA network. A private BCA subschema includes a database object that an administrator of a DBMS participant may not desire or need to share across a BCA network and that may be used by the administrator to manage, monitor, or supplement the security of the BCA network. For example, database objects, such as views or supplemental tables, may be created that are not intended to be shared with other BCA network participants. Referring to FIG. 3, BC schema 332 includes Private Sub-Schema 340. Private Sub-Schema 340 includes Call Back Procedures 342 and Views 344.

Call Back Procedures 342 can include a BCA DML callback procedure and/or BCA DDL callback procedure. These are procedures that can be privately implemented by an administrator of a DBMS participant to implement additional logic to determine whether to vote to commit DML or DDL changes specified in a block. A BCA DML callback procedure is used to determine whether to vote to commit DML changes specified in a TC block. A BCA DDL callback procedure is used to determine whether to vote to commit DDL changes in a TD block. A TD block specifies a DDL change, and shall be described later in more detail.

Blockchain apply invokes the BCA DML callback procedure to determine whether a particular "DML commit criterion" for the DML change is satisfied. The result returned indicates whether the particular DML commit criterion is satisfied. A vote to accept or to reject committing DML changes specified in a TC block is based on the result.

For example, a ledgered table in a BCA network stores banking account transfers between banks. Each bank operates a DBMS participant in the BCA network. The bank of a particular DBMS participant wishes to obtain approval by a bank officer for any banking transaction over 1 million dollars. In this case, the DML commit criteria include that a bank officer approves a banking transaction that is over 1 million dollars. The bank implements a BCA DML callback procedure that processes approval by a bank officer and returns a result indicating whether the transfer is approved. The BCA DML callback procedure is invoked at, for example, operation 245.

Multi-Version Database Dictionary

According to an embodiment, DB Dictionary 330 is a multi-version dictionary. The multi-versioning capabilities of a multi-version dictionary are leveraged to effect DDL changes to the distributed BC schema in a BCA network.

In a multi-version dictionary, versions of one or more groups of definitions within a multi-version dictionary are tracked. Each group is referred to as an epoch group and each version of the epoch group is referred to as an epoch. Each epoch is identified by an epoch identifier ("epoch id"). The epoch ids of an epoch group are ordered such that an epoch id is greater than any epoch id of any earlier epoch for the epoch group.

According to an embodiment, a BC schema is treated as an epoch group. Thus, multiple epochs of a BC schema are tracked and associated with an epoch id.

An epoch may be generated in response to executing a DDL statement issued to initiator DBMS 110. For example, in response to a DDL command received by initiator DBMS 110 to add a column to Ledgered Table 102-1, a new epoch and epoch id for BC schema 332 are created. The epoch includes a definition for the new column within Ledgered Table Definition 333. As another example, in response to a DDL statement received by initiator DBMS 110 to add a new DBMS participant to BCA network 101, a new epoch and epoch id for BC schema 332 are created. The epoch includes a new version of Participants Definition 334 which includes metadata about the new DBMS participant.

According to an embodiment, only one epoch for an epoch group is active. A DBMS participant can only use the active BC schema epoch to compile database statements. For example, when compiling a database statement that references a column name of a ledgered table and the column name is not defined for the active epoch of the ledgered table but is defined for another epoch of the table, the column name does not resolve, and a compiler error is generated.

When an epoch for an epoch group is created, it is not immediately active but may be activated at a later time. An epoch may also be later invalidated. An epoch can be pending, valid, or invalid. When invalid or pending, an epoch cannot be active. When an epoch is created, it may be initially pending.

Active Epoch 336 holds the active epoch for a BC schema. Epochs 337 is a list of epochs generated for BC schema 332. The list includes columns EPOCH ID and EPOCH STATUS. Each entry corresponds to an epoch and includes an epoch ID and the status of the epoch in columns EPOCH ID and EPOCH STATUS, respectively.

Illustrative Blocks in a Blockchain

Figure 4:
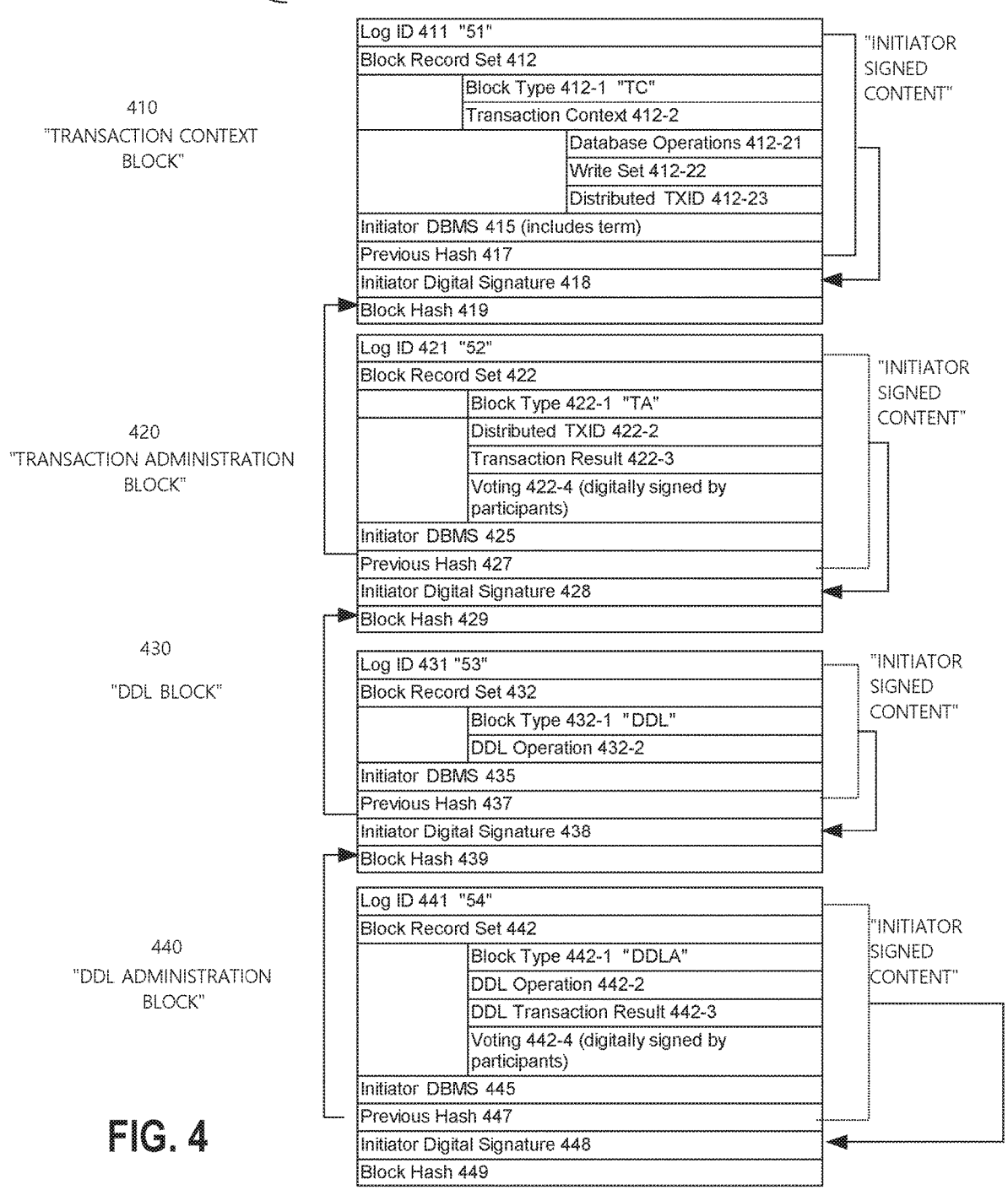
FIG. 4 is a diagram depicting blocks in blockchain according to an embodiment of the present invention.

FIG. 4 depicts an illustrative sub-chain 401, according to an embodiment of the present invention. As used herein, the term blockchain may also be used to refer to a sub-chain of a "complete" blockchain. A complete blockchain begins with a genesis block.

Sub-chain 401 includes four block types. These include a TC block and a TA block. In addition to these block types, Sub-chain 401 includes a DDL block and DDL administration block. A DDL block specifies a DDL change to a BC schema to replicate across a BCA network. A DDL administration block describes whether the DDL change was in fact replicated and/or accepted.

Referring to FIG. 4, it depicts block 410, block 420, block 430, and block 440, which belong to a complete blockchain that is not depicted. Each of the blocks has a common set of attributes. In addition, each has a record set. However, there is a different record set type for each block type.

Each block in sub-chain 401 is contained in a log record of a BC log and has a "blockchain position" in a "blockchain order" of a blockchain. The log id of the log record reflects the block's blockchain position.

A block may include digitally signed block content ("signed content") that is digitally signed by one or more DBMS participants. As described later, much of the block's content is "initiator signed content" that is digitally signed by the initiator DBMS. Some of the block's content may be provided by a follower DBMS, such as a follower DBMS's vote. In general, particular content in a block provided by a particular follower DBMS should be "follower signed content" that is digitally signed by the follower DBMS. A block also includes the one or more digital signatures for the initiator signed content and follower signed content.

A block contains a block hash value and optionally a previous block hash value, which are pertinent to, among other things, blockchain order and validity of the block. The block hash value of a block is a hash value generated by applying the block hash algorithm for the blockchain to the "hashed content" of the block. The previous hash value in a block is the block hash value of the previous block in the blockchain order. The hashed content of a block hash value includes the digitally signed content, the previous hash block value, as well as other content of the block.

Referring again to FIG. 4, each of blocks 410, 420, 430, and 440 contains an attribute for a previous hash value and a block hash value. Specifically, blocks 410, 420, 430, and 440 include, respectively, Previous Hash 417 & Block Hash 419, Previous Hash 427 & Block Hash 429, Previous Hash 437 & Block Hash 439, and Previous Hash 447 & Block Hash 449.

In block 420, the hash value of Previous Hash 427 is the hash value of Block Hash 419. The hash value of Previous Hash 437 is the hash value of Block Hash 429, and so forth.

Each block in sub-chain 401 includes an initiator DBMS attribute, which includes at least two fields. One field identifies the initiator DBMS that created and proposed the block, and the term ID of the leadership term during which the block was proposed. Blocks 410, 420, 430, and 440 include Initiator DBMS attribute Initiator DBMS 415, 425, 435, and 445, respectively.

Each block in sub-chain 401 includes a log ID attribute that holds the log ID of the log record holding the block. Blocks 410, 420, 430, and 440 respectively include attribute Log ID 411, 421, 431, and 441.

Each block in sub-chain 401 includes an initiator digital signature attribute that holds a digital signature of the initiator signed content of a block. For example, in block 410, the initiator signed content includes Log ID 411, Block Record Set 412, Initiator DBMS 415, and Previous Hash 417. Initiator Digital Signature 418 holds the digital signature for initiator signed content of block 410. Blocks 420, 430, and 440 include Initiator Digital Signature 428, 438, and 448, respectively, for initiator signed content similar to that of Block 410, as shown by FIG. 4.

Except for the genesis block in a blockchain, a valid block requires that hashed content include the previous hash value and that the block hash value of the block equals the hash value generated by the block hash algorithm based on the hashed content of the block. When a block is proposed to be added to a blockchain, proposal-acceptance criteria applied by a BCA participant for determining to accept or reject the proposed block include that the proposed block's hash value equals the hash value generated by applying the block hash algorithm to the hashed content of the proposed block, where the hashed content includes the previous hash value.

Record Sets

The structure and content of a block's record set depend on the block's type. Block Record Set 412 in block 410 is representative of the block record set of a TC block.

Block Record Set 412 includes block type attribute Block Type 412-1, which specifies the block type of the block containing the record set. Block Record Set 412 also includes transaction context 412-2, which includes Database Operations 412-21 and Distributed TXID 412-23. Database Operations 412-21 includes the specification of database operations executed by the respective initiator DBMS for the distributed transaction. Write Set 412-22 is the write set generated by executing the database operations. Distributed TXID 412-23 contains the distributed txid of the distributed transaction for which the block 410 was proposed to a BCA network.

Block Record Set 422 in block 420 is representative of a block record set for a TA block. Block Record Set 422 includes block type attribute Block Type 422-1, Distributed TXID 422-2, Transaction Result 422-3, and Voting 422-4. Distributed TXID 422-2 is the distributed txid of the distributed transaction, the result of which block 420 represents. Transaction Result 422-3 specifies the result, i.e., whether the distributed transaction was committed or aborted.

Voting 422-4 lists the votes of the follower DBMSs to commit or abort the transaction. Each vote of a follower DBMS is follower signed content that is digitally signed by a follower DBMS. Voting 422-4 includes the respective digital signatures for the votes.

Block Record Set 432 in block 430 is representative of a block record set for a DDL block. Block Record Set 432 includes block type attribute Block Type 432-1 and DDL Operation 432-2, which specifies one or more DDL changes to make to the respective BC schema. The DDL changes may be implemented by one or more DDL statements.

Block Record Set 442 in block 440 is representative of a block record set for a DDL administration block. Block Record Set 442 includes block type attribute Block Type 442-1 and DDL Operation 442-2, which represents the proposed DDL change, the result of which block 440 represents. DDL Transaction Result 442-3 specifies that result. Voting 442-4 lists the votes of the DBMS participants that led to the result.

Voting 442-4 lists the votes of the follower DBMSs to commit or abort the transaction. Each vote of a follower DBMS is follower signed content that is digitally signed by a follower DBMS. Voting 442-4 includes the respective digital signatures for the votes.

In an embodiment, some information depicted in a TA block or TDA block may be piggybacked onto other types of blocks. For example, after proposing a TC block for a particular distributed transaction, an initiator DBMS receives some votes for the distributed transaction from follower DBMSs. Before receiving all the votes for the particular distributed transaction, the initiator DBMS proposes a subsequent TC block for another distributed transaction. To record the votes received for the particular distributed transaction, the initiator DBMS may include votes received in the subsequent TC block.

In an embodiment, a block may include multiple record sets. For example, a TC block may include two record sets for two distributed transactions.

In an embodiment, the record sets may be different record set types, making the block a hybrid block. For example, the block may include a record set to propose a distributed transaction, like Record Set 412 of TC Block 410, and may include a record set to record the voting results for another distributed transaction, like Record Set 422 of TA Block 420.

Handling No-Consensus for Adding Blocks

According to an embodiment, DBMS participants insert and commit log records while a log record is in the pending status. Even though a block consensus outcome has not been reached before committing the log records, it is important to commit log records so that various recovery scenarios may be handled, as shall be explained in further detail later. However, at various stages of blockchain apply, a proposed log record may be rejected. Handling a proposed log record that has been committed and then rejected poses several complications.

First, a log-based consensus algorithm may require that a single log ID only be assigned to proposals that are accepted, and that log IDs be assigned in the order the respective log records are accepted. Thus, a measure is needed to ensure a log ID is not assigned to a committed log record that is ultimately rejected. Second, since initiation and/or completion of local transactions that make changes to a ledgered tabled are tied to the addition of blocks to a blockchain when a log record is rejected, any uncompleted local transactions need to be addressed.

Figure 5:
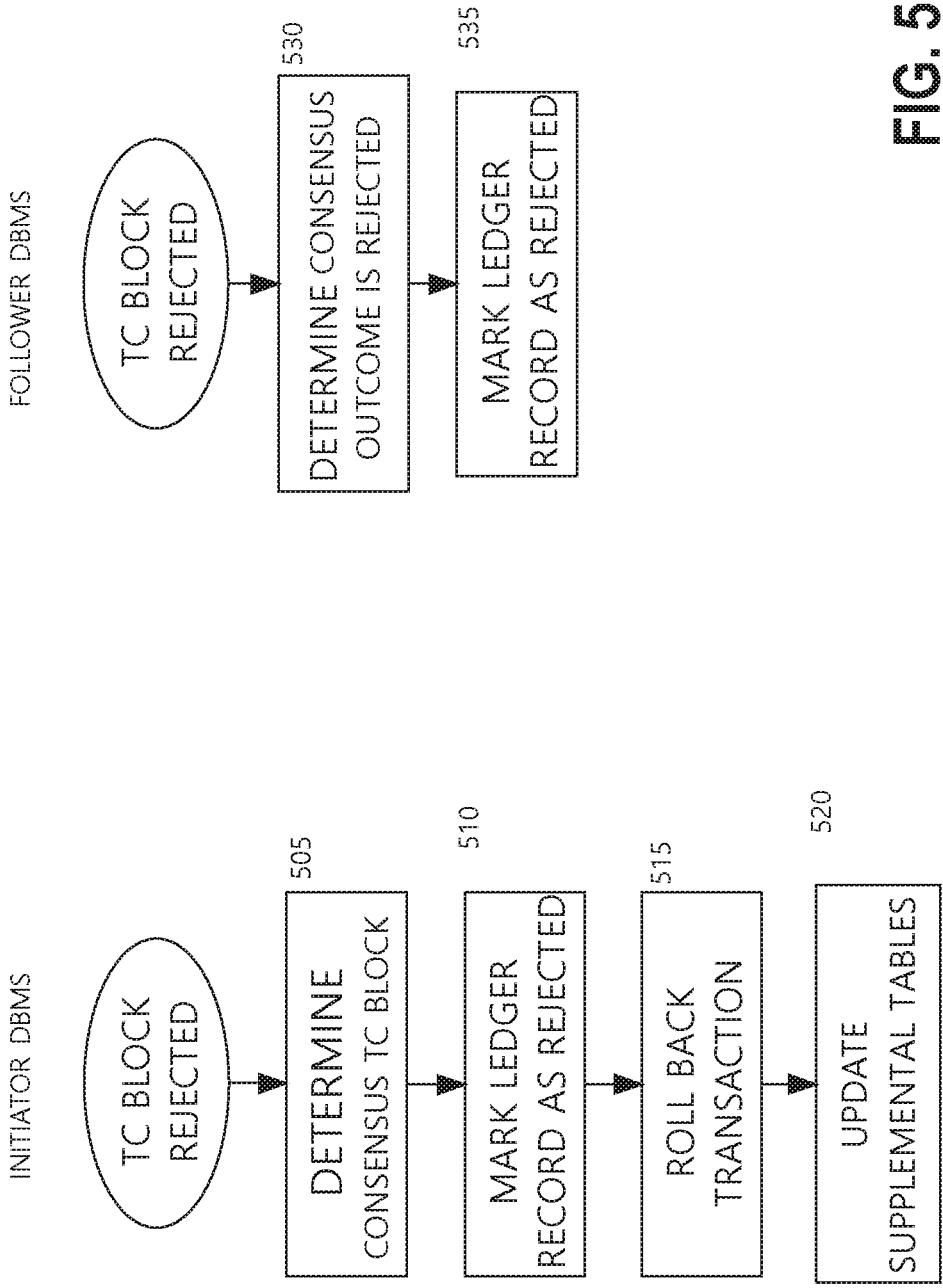
FIG. 5 is a diagram depicting blockchain apply recovery procedures according to an embodiment of the present invention.

Procedures for addressing the rejection of a log record for a TC block under various scenarios are illustrated by FIG. 5. Referring to FIG. 5, operations 505-520 are performed by initiator DBMS 110 after having proposed a log record for a TC block for a distributed transaction. The log record has been committed by initiator DBMS 110 to BC log 103-1.

Initiator DBMS 110 determines that the block consensus outcome for a log record is rejected (505). Initiator DBMS 110 marks the BC log 103-1 as having been rejected by updating column OUTCOME of BC log 103-1 to specify that the log record has been rejected (510).

The log ID of a log record marked as rejected in this way is not treated as being assigned to a valid log record and block, and is in effect, ignored. The log ID is used for another log record that is accepted.

Initiator DBMS 110 rolls back the local transaction for the distributed transaction for the proposed TC block (515). Initiator DBMS 110 updates supplemental tables. These updates may include updating a row for the distributed transaction (i.e. row that includes the distributed txid) in Blockchain Transactions 310 to indicate that the transaction was aborted.

Operations 530-535 are operations performed by follower DBMS 120 and 130 after having committed a log record for which the block consensus outcome is rejected. The operations are illustrated with respect to follower DBMS 120. Follower DBMS 120 determines that the proposed log record has been rejected (530).

Follower DBMS 120 marks its respective BC log 103-2 as having been rejected by updating column OUTCOME of BC log 103-2 to specify that the log record has been rejected. The row for the distributed transaction in the blockchain transactions table on follower DBMS 120 is updated to denote the distributed transaction is aborted. Because the proposed log record was rejected, follower DBMS 120 never initiated a local transaction for the distributed transaction. Therefore no branch transaction is rolled back.

Operations performed when a log record for a TA block is rejected are similar to those performed for a TC block.

Proposal Recovery

An initiator DBMS may lose leadership before coordinating the completion of a distributed transaction against a ledgered table. Leadership may be lost at various points of blockchain apply: for example, before reaching a block consensus outcome for the TC block, before reaching a commit consensus outcome for the distributed transaction, or before reaching a block consensus outcome for the TA blocks. Leadership may be lost because a leadership term has expired or because an initiator DBMS went down.

When leadership is lost, a pending proposal initiated by the initiator DBMS may be deemed to have a consensus outcome that is rejected and is processed by the other DBMS participants accordingly. Such processing may include marking committed log records for the proposal as rejected. The initiator DBMS may simply abort the distributed transaction and inform the requesting client that requested the transaction of such. The client may then initiate the transaction with a new leader.

However, there are situations where it may be desirable to complete the distributed transaction. For example, the distributed transaction may be a long running transaction which may be relatively costly to the requesting client to abort. According to an embodiment, a DBMS participant may resubmit a proposal to the current initiator DBMS to complete processing of the distributed transaction through a procedure referred to herein as proposal recovery.

Figure 6:
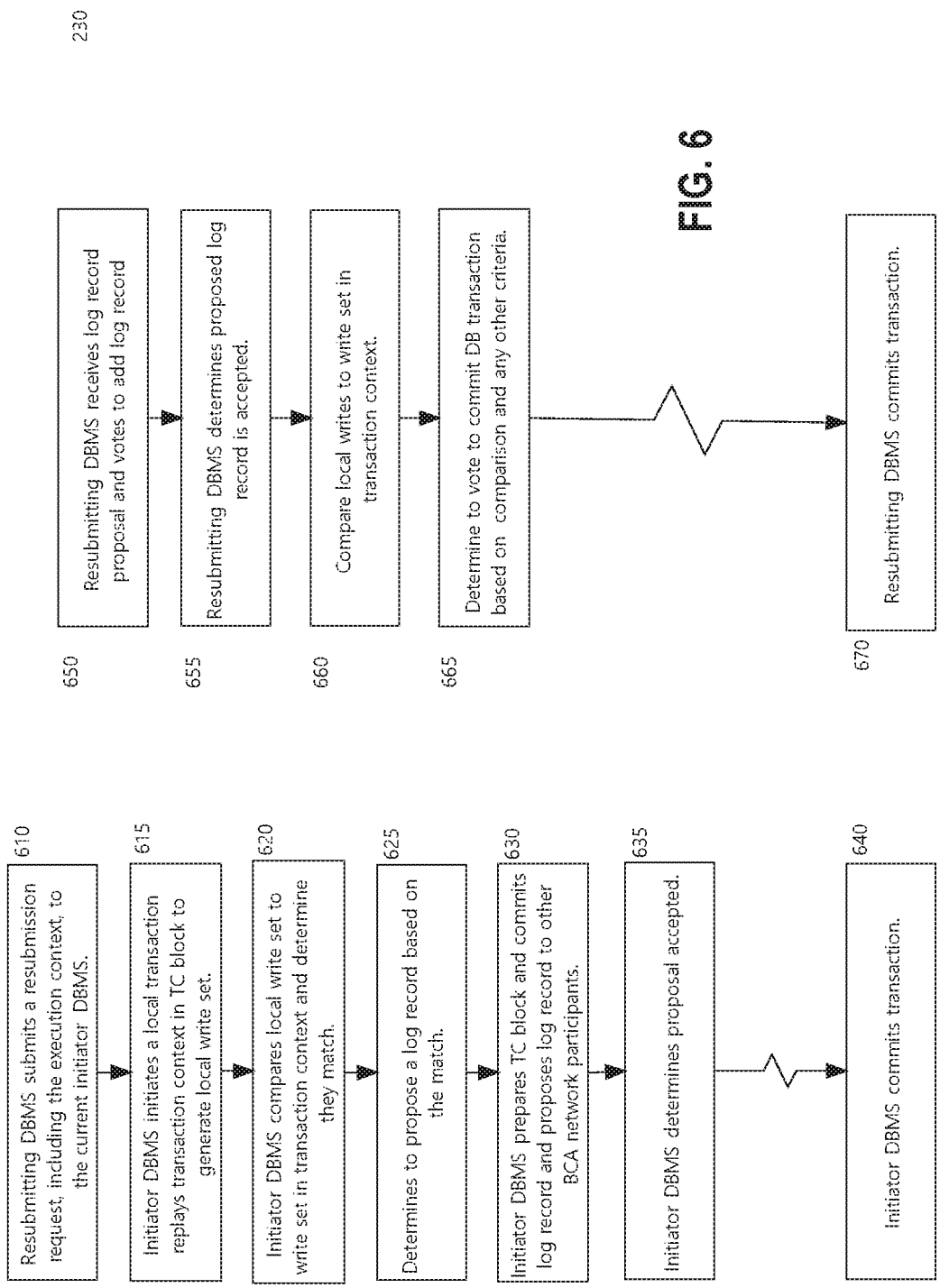
FIG. 6 is a diagram depicting blockchain apply recovery procedures according to an embodiment of the present invention.

FIG. 6 depicts a procedure for proposal recovery. FIG. 6 does not illustrate some operations of proposal recovery. Many of the operations of proposal recovery are similar to those depicted in FIG. 2, and may not be described at the level of detail as before, or described at all.

The procedure may be performed in response to a variety of events that cause loss of leadership. However, for purposes of illustration, proposal recovery is initiated by a former initiator DBMS ("resubmitting DBMS") after losing leadership due to election of a new leader and while in the process handling the proposal of a log record for a TC block after having committed the log record.

Referring to FIG. 6, the resubmitting DBMS submits a "resubmission request" to the current initiator DBMS (610). The resubmission request includes a "resubmitted transaction context", which is the transaction context that was previously generated by the resubmitting DBMS for the distributed transaction. The resubmitting DBMS may retrieve the transaction context from its BC log.

The initiator DBMS initiates a local transaction and replays the transaction context to generate a local write set (615) and compares the local write set to the proposed write set in the resubmitted transaction context and determines the write sets match (620).

In response to the determination that the write sets match, the initiator DBMS determines to vote to propose a log record (625) and prepares a proposed log record, including the TC block for the proposed log record (630). The log record is committed and proposed to the DBMS participants, including the resubmitting DBMS.

Similarly to that described in FIG. 2, the DBMS participants execute a set of operations in which the DBMS participants vote to accept the log record, prepare to commit the transaction, vote to commit the transaction, accept the TA block, and commit the distributed transaction, including the respective local branch transaction.

However, the resubmitting DBMS executes a different set of operations. Similarly to the other DBMS participants, the resubmitting DBMS receives the proposed log record from the initiator DBMS, and votes to add the log record to the BC log (650). The resubmitting DBMS then determines the proposed log record is accepted (655).

However, the resubmitting DBMS does not have to replay the transaction context of the TC block in the log record because the resubmitting DBMS has already generated a local write set for the distributed transaction. In addition, the resubmitting DBMS has already prepared to commit the local transaction for the distributed transaction and does not have to prepare to commit again.

Based on a comparison of the local write and the proposed write set in the TC block of the log record (660), the resubmitting DBMS determines to vote to commit the distributed transaction (665). Eventually, the distributed transaction is committed, and the initiator DBMS commits its local branch transaction (640), the resubmitting DBMS commits its local branch transaction, as well as the other DBMS participants (670).

Changing a BC Schema

Similar to a distributed ledgered table, a BC schema is distributed among the DBMS participants of a BCA network. Changes to the distributed BC schema are propagated throughout a BCA network through blocks using blockchain apply.

If the DBMS participants support distributed transaction processing for DDL statements, then DDL changes may be replicated to the BC schema using a blockchain apply procedure similar to the DML blockchain apply procedure depicted by FIG. 2.

However, some DBMSs do not support distributed transaction processing of DDL changes, or may only support statement level local transactions. For such DBMSs, when making DDL changes, there is no protocol, such as a two-phase commit, that enables DBMSs to arbitrate whether DDL changes should be made permanent. In these cases, "DDL blockchain apply" procedures such as those described below may be used.

Figure 7:
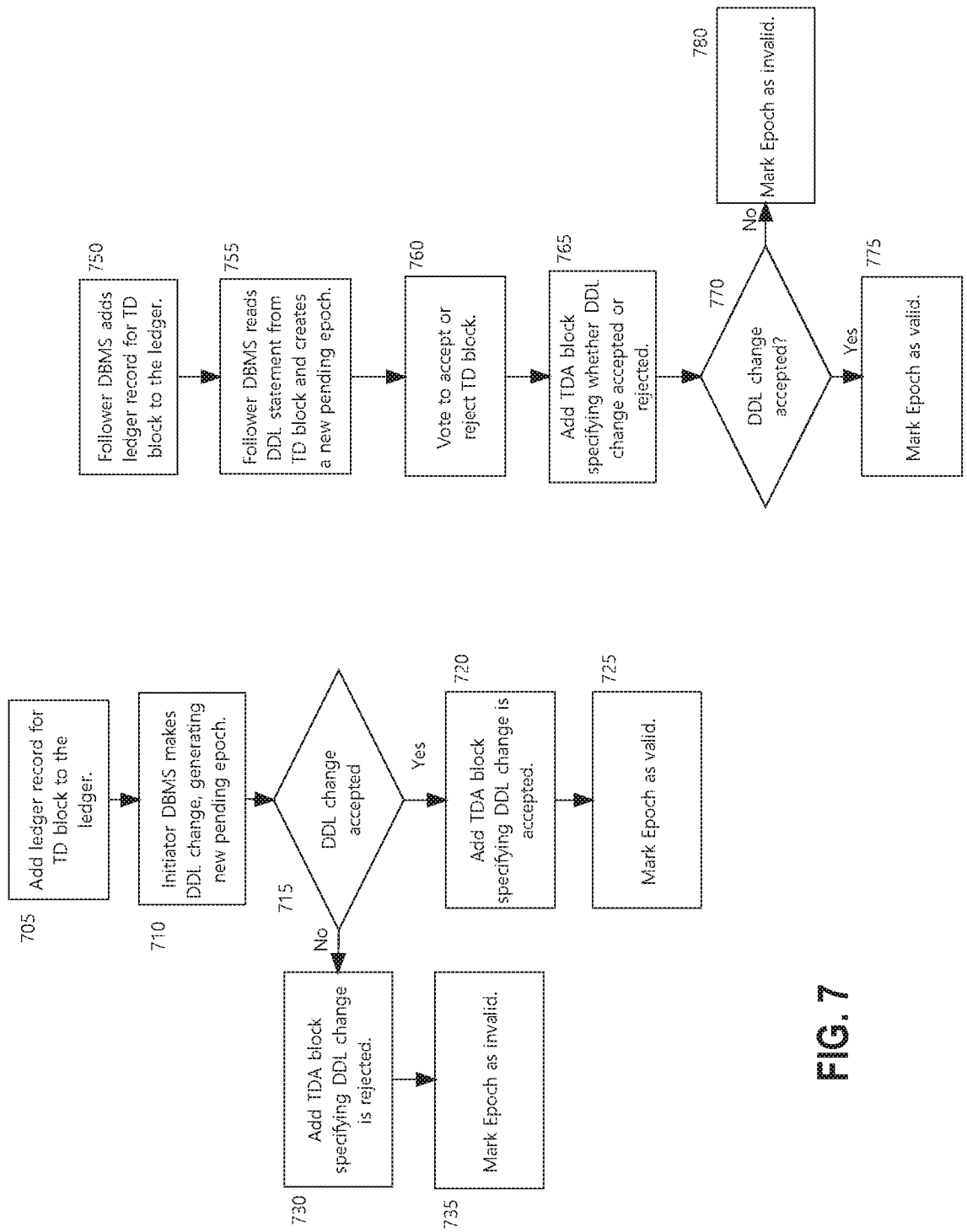
FIG. 7 is a diagram depicting blockchain procedure for applying DDL changes according to an embodiment of the present invention.

FIG. 7 depicts a procedure for "DDL blockchain apply" that uses a multi-version data dictionary that supports epochs as previously described. According to an embodiment, the procedure is initiated in response to receipt of a DDL statement received by an initiator DBMS specifying a DDL change to BC schema 332. The DDL change may be, for example, a DDL change to Ledgered Table Definition 333 to add a column restriction or to Participants Definition 334 to alter connection information for a participant.

Referring to FIG. 7, in response to receiving the DDL statement, according to a log-based consensus algorithm, initiator DBMS 110 adds a log record for a DDL block to BC Log 103-1 (705) and follower DBMS 120 and 130 add a log record for a DDL Block to BC Log 103-2 and 103-3, respectively (750). The DDL Block specifies the DDL statement. After adding the log record, initiator DBMS 110 makes the DDL change to Ledgered Table Definition 333 thereby creating a new pending epoch (710).

Follower DBMS 120 and 130 read the DDL statement in their respective DDL block from the just added log record and execute the DDL statement to create a new pending epoch (755). According to a log-based consensus protocol, follower DBMS 120 and 130 vote to accept or reject the DDL change (760).

Initiator DBMS 110 determines the "DDL consensus outcome" for the DDL change (715). If the "DDL consensus outcome" is accepted, then a log record that includes a TDA block specifying that the DDL change is accepted and is added to BC Log 103-1 (720). DB Dictionary 330 is updated to mark the new epoch as valid (725). If the DDL consensus outcome is rejected, then a log record that includes a TDA block specifying that the DDL change is rejected and is added to BC Log 103-1 (730). BC schema 332 is updated to mark the new epoch as invalid (735).

Follower DBMS 120 and 130 add a TDA log record for the DDL block to BC Log 103-2 and 103-3, respectively (765). Follower DBMS 120 and 130 read the TDA block to determine whether the DDL change is accepted or rejected (770). If accepted, the new epoch is marked valid (775). If rejected, the new epoch is marked invalid.

Staged Data Dictionary

In a staged data dictionary, versions of definitions are not separately tracked. However DDL changes to the data dictionary may be staged. When a DDL change to a definition is changed by a DDL transaction, the changes are marked as pending within the data dictionary. The changes may later be made effective by marking the DDL changes as valid or otherwise unmarking the changes as no longer pending. Alternatively, the changes may be marked as valid or removed by a compensating DDL transaction.

Replicating DDL changes to DBMS participants that use a staged dictionary may use a DDL blockchain apply procedure similar to that depicted in FIG. 7. However, rather than creating new pending epochs that may be later validated or invalidated, DDL changes are initially marked as pending. If accepted, the DDL changes may be marked as valid. If not accepted, the DDL changes are marked as invalid or removed by a compensating DDL transaction.

Bootstrapping BCA Network

Bootstrapping a BC network ("bootstrapping") refers to configuring BCA participants so that blockchain apply is initiated for a particular BC schema that is originally created at one of the BCA participants. Bootstrapping entails proposing a BC schema to BCA participants for acceptance, and if accepted, creating the BC schema on each of the BCA participants.

Bootstrapping begins at an initiator DBMS, where the BC schema is created by, for example, an administrator of the initiator DBMS. Once created, a DDL statement is issued to the initiator to bootstrap the BCA network.

Figure 8:
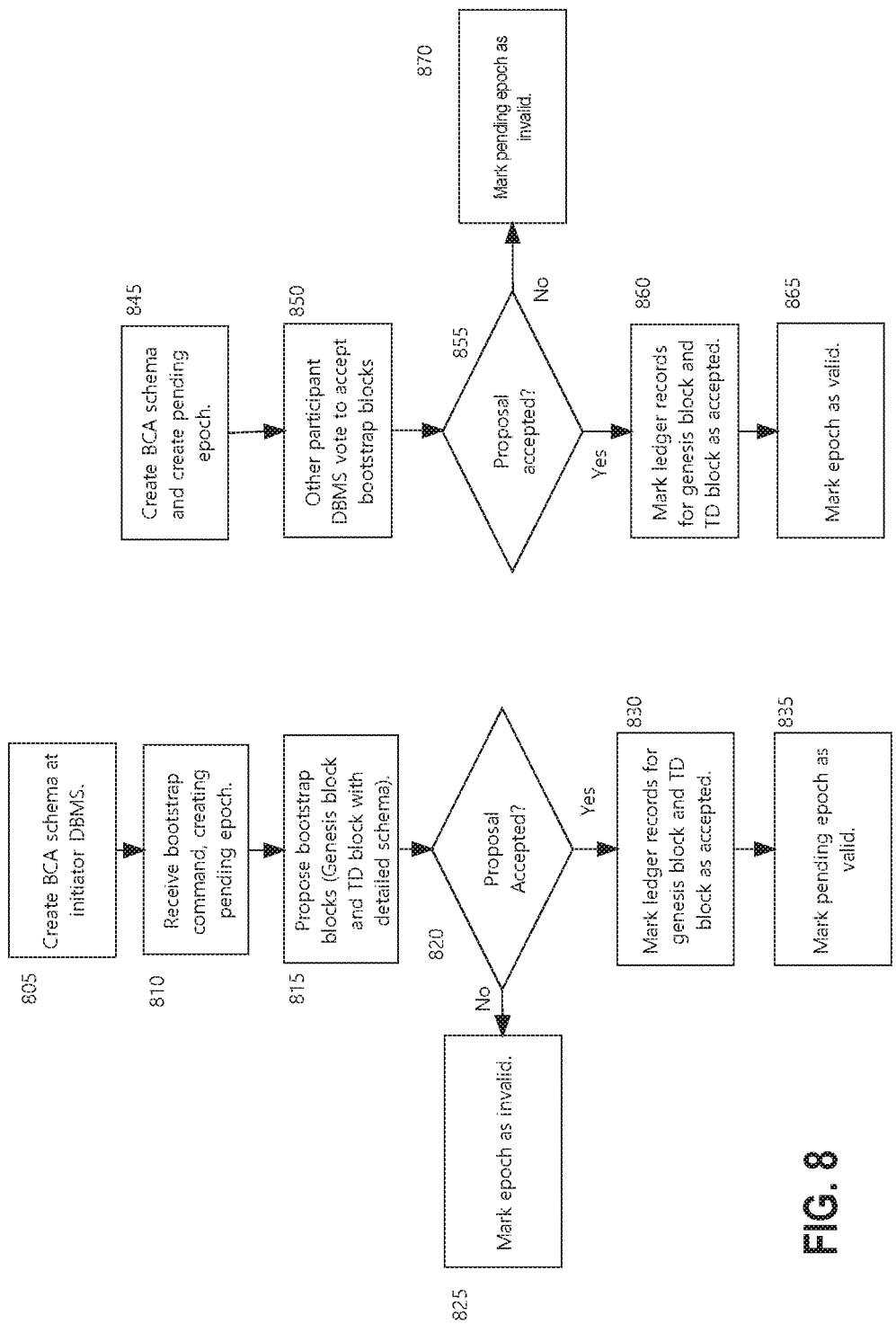
FIG. 8 is a diagram depicting a procedure for bootstrapping blockchain apply according to an embodiment of the present invention.

FIG. 8 is a flowchart of a procedure that uses bootstrapping according to an embodiment of the present invention. Referring to FIG. 8, the BC schema is created by the initiator DBMS in response to DDL statements issued to the initiator DBMS (805). The BC schema specifies the BCA participants.

Next, the initiator DBMS receives a bootstrap command to bootstrap the BC schema and creates a pending epoch for the BC schema (810). The initiator DBMS generates log records, one for the genesis block and one for a TD block. The TD block specifies the DDL changes to create the BC schema. The initiator DBMS then proposes the log records for the genesis block and TD block to the other DBMS participants defined by the BC schema (815).

The other DBMS participants receive the proposed log records for the genesis block and TD block. In response, the other DBMS participants create the BCA schema and create a pending epoch (845). The other DBMS participants vote to accept or reject the BC schema (850).

Based on the votes by the DBMS participants, the initiator DBMS determines whether the proposed genesis block and TD block are accepted or rejected (820). If rejected, the pending epoch for the BC schema is marked invalid (825).

If accepted, the initiator DBMS marks ledger records for the genesis block and TD block as accepted. (830). The initiator DBMS then marks the pending epoch as valid.

With respect to the other DBMS participants, the other participants determine whether the proposed log records are accepted (855). If accepted, the other BCA participants mark ledger records for the genesis block and TD blocks as accepted (860), and then mark the epoch as valid (865). Otherwise, the other BCA participants mark the pending epoch as invalid (870).

Blockchain Apply in File Systems

As mentioned before, other forms of PSSs other than a DBMS may incorporate blockchain apply to manage a ledgered repository of objects so long as the PSSs support distributed transaction processing, and in particular, support the ability to reach a prepared state for a transaction, to acknowledge reaching the prepared state to a transaction coordinator of the transaction, and to commit or abort the prepared transaction when requested by the coordinator.

Figure 9:
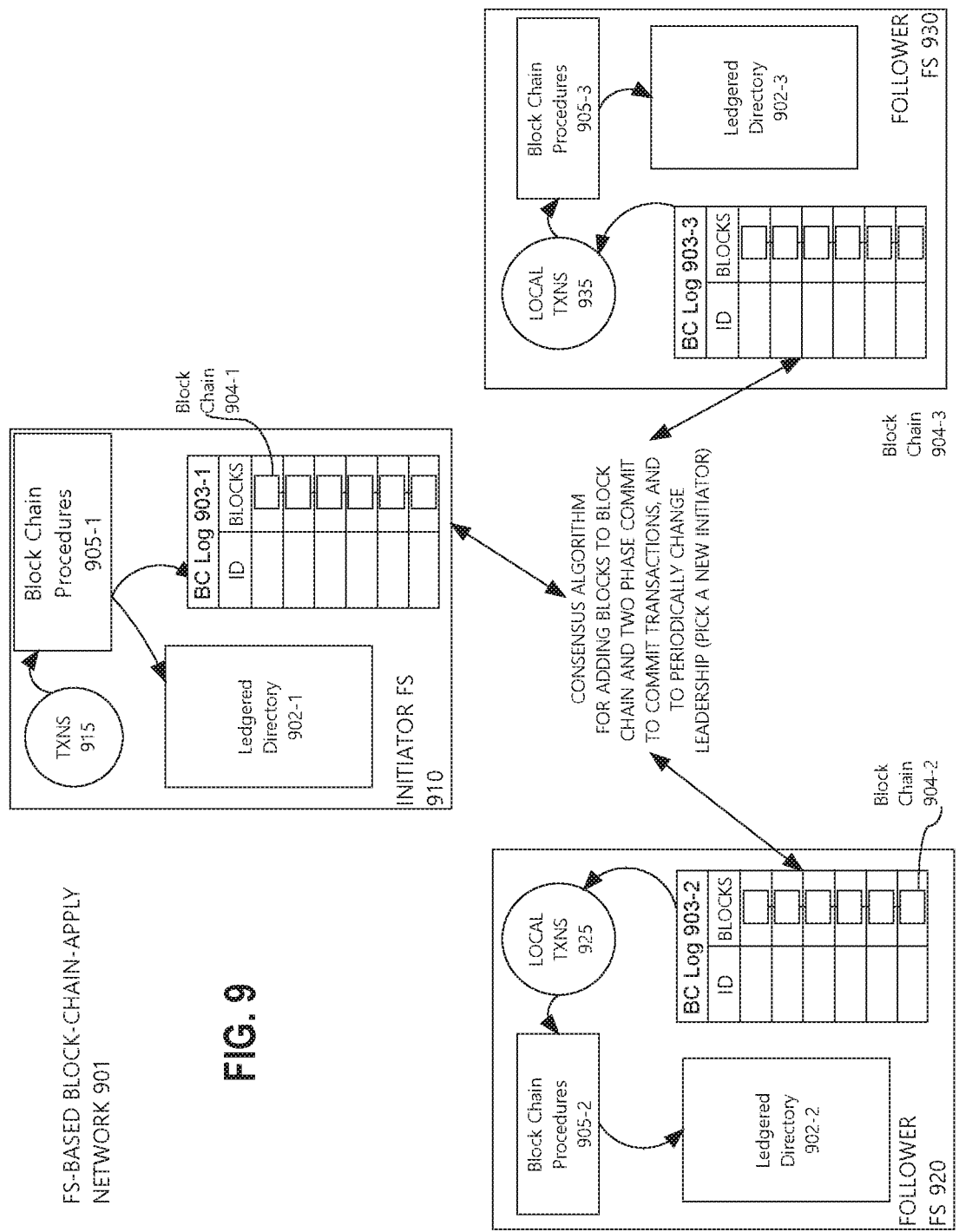
FIG. 9 is a diagram depicting a blockchain apply network for a file system according to an embodiment of the present invention.

FIG. 9 illustrates a replicated file system network that implements blockchain apply in a BCA network in which BCA participants are file systems ("FS"). Such a replicated file system network is referred to herein as a FS-based BCA network. A FS may comprise one or more storage servers, having one or more processors, memory, and persistent storage on which files are stored. The FS provides access to files through a file system protocol over a network or via an interface.

The FS-based BCA network supports distributed transaction processing and journaling to replicate files at each of the FS-based BCA participants. Each of the FS-based BCA participants are independent file systems connected via, for example, a wide area network. The distributed ledgered data is a directory ("ledgered directory") replicated on each of the FS-based BCA participants as a directory replica.

Referring to FIG. 9, it depicts a BCA network 901, a FS-based BCA network according to an embodiment of the present invention. Referring to FIG. 9, FS-based BCA network 901 includes initiator FS 910 and follower FS 920 and follower FS 930. Each of these file systems participates in maintaining changes to a replica of a ledgered directory using blockchain apply. The changes include adding, deleting, and moving files and subdirectories, modifying data in files and changing properties of files and subdirectories. Changes to a ledgered directory are initiated at and by initiator FS 910.

Similar to as mentioned previously for BCA network 101, BCA participants in FS-based BCA network 901 rotate the role of initiator FS. Thus, FIG. 9 represents roles of the BCA participants at a particular point in time. At another point in time, follower FS 920 or follower FS 930 may be an initiator FS of BCA network 901. An initiator FS retains leadership for a leadership term.

Referring to FIG. 9, FS-based BCA network 901 includes a ledgered directory, which is comprised of replicas that are stored as Ledgered Directory 902-1, Ledger Directory 902-2, and Ledgered Directory 902-3 on initiator FS 910, follower FS 920, and follower FS 930, respectively.

Distributed blockchain 904 comprises replicas of the distributed blockchain, which are blockchain 904-1, blockchain 904-2, and blockchain 904-3. These blockchain replicas are stored on initiator FS 910, follower FS 920, and follower FS 930, respectively.

Blockchains 904-1, 904-2, and 904-3 are stored in a distributed blockchain log, which comprises BC log 903-1, BC log 903-2, and BC log 903-3, and which are stored on initiator FS 910, follower FS 920, and follower FS 930, respectively.

As BC log 903-1, BC log 903-2, and BC log 903-3 comprise a distributed BC log, each contains replicas of the log records of the distributed BC log. Each log record includes a log identifier (log ID), which uniquely identifies the log record in BC log 903. Each replica of a log record includes the same log ID. Log IDs are generated similarly as that described for BCA network 101.

As shall be explained in greater detail, initiator FS 910 initiates distributed transactions to replicate the changes to the replicated directory across BCA network 901. The changes are replicated by replicating log records at follower FSs 920 and 930. Initiator FS 910 coordinates with follower FSs 920 and 930 to add log records to distributed BC log 903. Adding log records in effect adds blocks to the distributed blockchain. Using distributed transaction processing coordinated by initiator FS 910, local transactions 925 and local transactions 935, which execute within follower FS 920 and follower FS 930, apply the changes specified in the log records to replicated directory replicas Ledgered Directory 902-2 and Ledgered Directory 902-3, respectively.

BCA network 901 also includes a distributed set of blockchain procedures 905. A blockchain procedure is a computer executable procedure or function, the implementation of which is accepted by and visible to a member of FS-based BCA network 901, and which is executed by a member of FS-based BCA network 901 to modify a replicated directory. According to an embodiment, the blockchain procedures may be implemented in a computer language, such as Java, Java Script, Python, or Solidity.

Blockchain procedures 905 comprise replica blockchain procedures 905-1, blockchain procedures 905-2, and blockchain procedures 905-3, which are stored on initiator FS 910, follower FS 920, and follower FS 930, respectively.

A FS-based BCA network 901 client may request changes to a replicated directory by initiating transactions 915 with initiator FS 910, in which the client may issue file system commands to change Ledgered Directory 902-1. The file commands may invoke stored blockchain procedures.

Transactions and File Commands

A BCA network 901 client may request changes to a replicated directory by initiating transactions 915 with initiator FS 910. The transactions include file system commands issued by the client to change Ledgered Directory 902-1.

File system commands include commands to open a file, close a file, rename or move or delete a file, write or delete a block in a file, and write or modify a line within a file. The file commands may also specify to create, move, rename, or delete directories, and may invoke stored blockchain procedures Log, Block Structure, Record Sets, and Supplemental Structures A log record, including a block of a blockchain, is stored in one or more data blocks in a file. Data blocks in a file are herein after referred to as "file data units", to distinguish data blocks in a file from blocks in a blockchain. Also, the memory address boundaries of a block in a log record is not necessarily aligned with a file data unit. For example, a log record may be stored in a single file data unit. The single file data unit stores a block as well as other data of the log record.

According to an embodiment, in FS-based BCA network, blocks include a TC block and TA block, similar to TC Block 410 and TA block 420. A TC block or TA block, rather than identifying an initiator DBMS and its term, identifies an initiator FS and its term.

A TC block for a FS-based BCA network also includes a transaction context. Rather than having a specification identifying database operations, the transaction context includes a specification that identifies file system commands and/or blockchain procedures and respective argument values. The proposed write set of the transaction context includes the results from executing the file system commands and/or blockchain procedures. Such results include, for example, (1) for over write of one or more file data units, the new version of the overwritten one or more file data units and, optionally, the previous version of the one or more file data units, (2) for renaming a file, the new name of a file, and optionally, the previous name of the file, (3) for a file move, the new directory of the file and optionally, the old directory of the file.

Similar to as described before, follower FS 120 and FS 130 replay the transaction context (i.e., execute the commands and/or procedures specified in the specification in the transaction context) within a branch transaction initiated by follower FS 120 and 130 for a distributed transaction to generate a local write set with which to compare to a proposed write set. The comparison determines, at least in part, whether follower FS 120 and 130 will vote to commit a distributed transaction.

Blockchain apply for FS-based BCA network 901 is handled similarly as described in FIG. 2, using the TC blocks and TA blocks for a FS-based BCA network described above. Handling no-consensus for adding blocks is performed similarly as described in FIG. 5, and proposal recovery is performed similarly as described in FIG. 6.

FS-based BCA network 901 may store information like that stored in the tables Blockchain Transactions 310 and Blockchain Votes 320 in analogous structures in an "embedded database" of an FS-based BCA participant. Any embedded database may be a relational database and NOSQL database, such as a key-value store or document store.

FS-Based BCA Schema

Similar to BC Schema 332 of BCA network 101, FS-based BCA network 901 also includes a schema that defines a blockchain. Such a schema is referred to herein as a FS-based BCA schema, and is distributed among the FS-based BCA participants.

Each FS-based BCA participant in FS-based BCA network 901 supports a command set similar to DDL commands described earlier for creating and/or modifying a FS-based BCA schema. An FS-based BCA schema may be stored in one or more files, or in an embedded database. FS-based BCA schema changes are propagated and coordinated between the FS-based BCA participants similar to as described in FIG. 7, using blocks similar to DDL blocks and DDL administration blocks described earlier, except that these blocks identify an initiator FS rather than an initiator DBMS.

Blockchain Apply in Document Storage Systems

Figure 10:
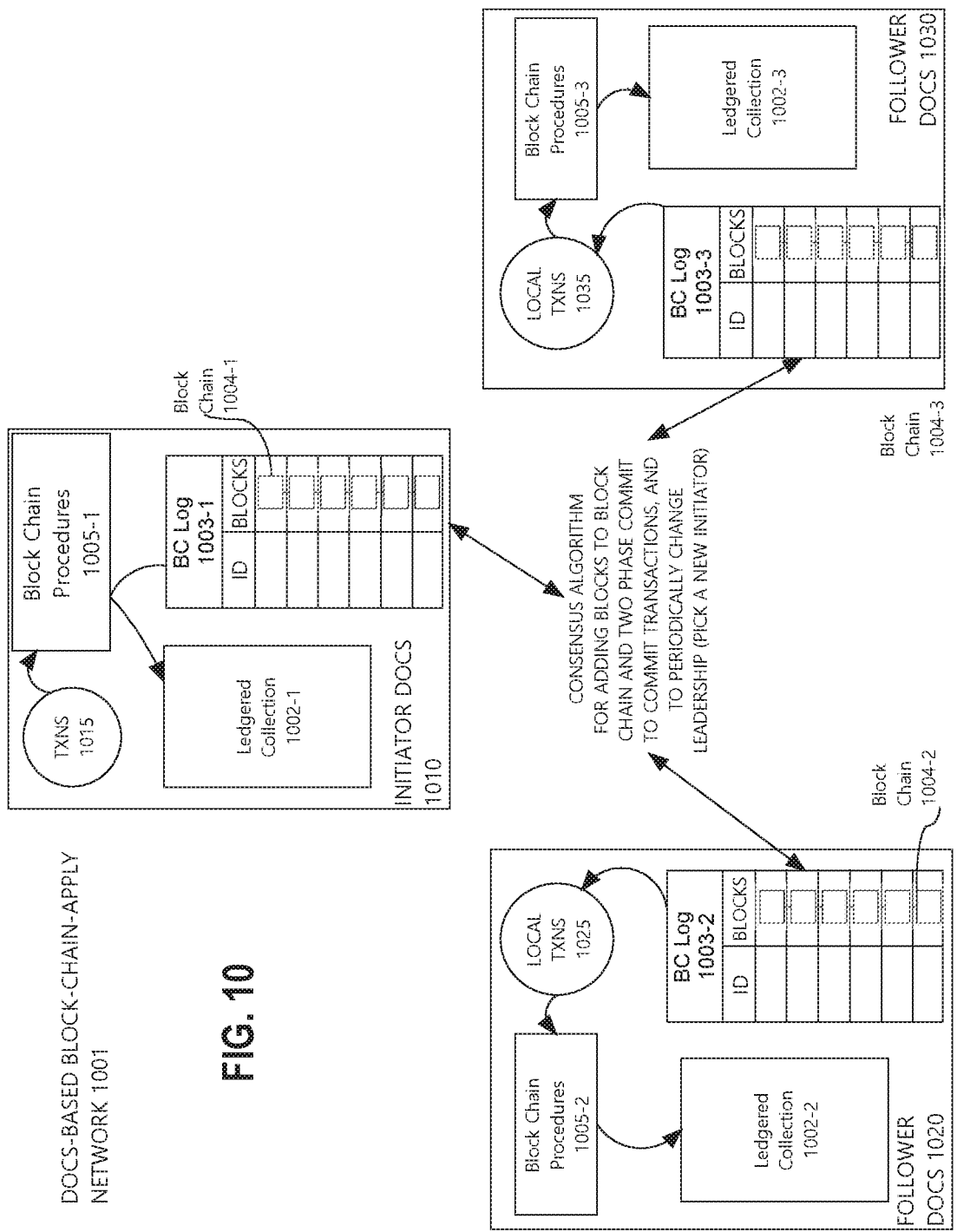
FIG. 10 is a diagram depicting a blockchain apply network for a document storage system according to an embodiment of the present invention.

FIG. 10 illustrates a replicated document storage system network that implements blockchain apply in a BCA network in which BCA participants are document storage systems ("DOCS") that store replicas of a document collection ("collection"). Such a replicated document storage system is referred to herein as a DOCS-based BCA network. Also, in an embodiment, a DOCS is an extended version of a key-value storage system. In a key-value storage system, the value stored does not need to conform to a mark-up language.

A DOCS may comprise one or more document storage servers, having one or more processors, memory, and persistent storage in which documents are stored. A DOCS provides access to documents through a document storage protocol that supports, among other features, CRUD-based ("create, read, update, delete") modification of documents. Documents are objects stored according to a mark-up language, such as XML or JSON.

Documents in a DOCS are contained within a document collection, which may be named in similar fashion to a table name. A collection is analogous to a table in a relational database. In a table, each record in the table is a row; in a collection, each record in the collection may be an XML or JSON document, or an XML, element or JSON field within a document.

A DOCS-based BCA network supports distributed transaction processing and journaling for changes to replicas of documents in collections. The distributed ledgered data in a DOCS-based BCA network is a collection that is replicated on each of the DOCS-based BCA participants using blockchain apply.

Referring to FIG. 10, it depicts a BCA network 1001, a DOCS-based BCA network according to an embodiment of the present invention. Referring to FIG. 10, DOCS-based BCA network 1001 includes initiator DOCS 1010 and follower DOCS 1020 and follower DOCS 1030. Each of these DOCS participates in maintaining CRUD changes to a ledgered collection securely using blockchain apply. Changes to a ledgered collection are initiated at and by initiator DOCS 1010.

Similar to as mentioned previously for BCA network 101, BCA participants in DOCS-based BCA network 1001 rotate the role of initiator DOCS. Thus, FIG. 10 represents roles of the DOCS-based BCA participants at a particular point in time. At another point in time, follower DOCS 1020 or follower DOCS 1030 may be an initiator DOCS of BCA network 1001. An initiator DOCS retains leadership for a leadership term.

Referring to FIG. 10, DOCS-based BCA network 1001 includes a ledgered collection, which is comprised of replicas that are stored as Ledgered Collection 1002-1, Ledgered Collection 1002-2, and Ledgered Collection 1002-3 on initiator DOCS 1010, follower DOCS 1020, and follower DOCS 1030, respectively.

Distributed blockchain 1004 comprises replicas of the distributed blockchain, which are blockchain 1004-1, blockchain 1004-2, and blockchain 1004-3. These blockchain replicas are stored on initiator DOCS 1010, follower DOCS 1020, and follower DOCS 1030, respectively.

Blockchains 1004-1, 1004-2, and 1004-3 are stored in a distributed blockchain log, which comprises BC log 1003-1, BC log 1003-2, and BC log 1003-3, and which are stored on initiator DOCS 1010, follower DOCS 1020, and follower DOCS 1030, respectively.

As BC log 1003-1, BC log 1003-2, and BC log 1003-3 comprise a distributed BC log, each contains replicas of the log records of the distributed BC log. Each log record includes a log identifier (log ID), which uniquely identifies the log record in BC log 1003. Each replica of a log record includes the same log ID. Log IDs are generated similarly as that described for BCA network 101.

As shall be explained in greater detail, initiator DOCS 1010 initiates distributed transactions to replicate the changes to the ledgered collection across BCA network 1001. The changes are replicated by replicating log records at follower DOCs 1020 and 1030. Initiator DOCS 1010 coordinates with follower DOCs 1020 and 1030 to add log records to distributed BC log 1003. Adding log records in effect adds blocks to the distributed blockchain. Using distributed transaction processing coordinated by initiator DOCS 1010, local transactions 1025 and local transactions 1035, which execute within follower DOCS 1020 and follower DOCS 1030, apply the changes specified in the log records to ledgered collection replicas Ledgered Collection 1002-2 and Ledgered Collection 1002-3, respectively.

BCA network 1001 also includes a distributed set of blockchain procedures 1005. A blockchain procedure is a computer executable procedure or function, the implementation of which is accepted by and visible to a member of DOCS-based BCA network 1001, and which is executed by a member of DOCS-based BCA network 1001 to modify a replicated directory. According to an embodiment, the blockchain procedures may be implemented in a computer language, such as Java, Java Script, Python, or Solidity. Blockchain procedures 1005 comprise replica blockchain procedures 1005-1, blockchain procedures 1005-2, and blockchain procedures 1005-3, which are stored on initiator DOCS 1010, follower DOCS 1020, and follower DOCS 1030, respectively.

Transactions and CRUD Commands

A BCA network 1001 client may request changes to a ledgered collection by initiating transactions 1015 with initiator DOCS 1010, transactions in which the client may issue DOCS commands to change Ledgered Directory 1002-1. The DOCS commands may include CRUD commands, and may invoke stored blockchain procedures. DOCS commands also include commands to change names or keys of documents and to open or close a collection or document.

Log, Block Structure, Record Sets, and Supplemental Structures

Log records are each stored as a document in a collection. The collection serves a BC log, and each log record in the BC log is a document. Blocks include a TC block and TA block, similar to TC Block 410 and TA block 420. A TC block or TA block, rather than identifying an initiator DBMS and its term, identifies an initiator DOCS and its term.

A TC block for a DOCS-based BCA network also includes a transaction context. Rather than having a specification identifying database operations, the transaction context includes a specification that identifies DOCS commands and/or blockchain procedures and respective argument values. The proposed write set of the transaction context includes the results from executing the DOCS commands and/or blockchain procedures. Such results include the document in the case of creating a document, and new values resulting from updates to documents.

Similar to as described before, follower DOCS 1020 and DOCS 1030 replay the transaction context within a branch transaction initiated by follower DOCS 1020 and 1030 for a distributed transaction to generate a local write set with which to compare to a proposed write set. The comparison determines, at least in part, whether follower DOCS 1020 and 1030 will vote to commit a distributed transaction.

Blockchain apply for DOCS-based BCA network 1001 is handled similarly as described in FIG. 2, using the TC blocks and TA blocks for a DOCS-based BCA network described above. Handling no-consensus for adding blocks is performed similarly as described in FIG. 5, and proposal recovery is performed similarly as described in FIG. 6. DOCS-based BCA network 1001 may store information like that stored in the tables Blockchain Transactions 310 and Blockchain Votes 320 in one or more collections.

DOCS-Based BCA Schema

Similar to BC Schema 332 of BCA network 101, DOCS-based BCA network 1001 also includes a schema that defines a blockchain. Such a schema is referred to herein as a DOCS-based BCA schema, and is distributed among the DOCS-based BCA participants.

Each DOCS-based BCA participant in DOCS-based BCA network 1001 supports a DDL command set for creating and/or modifying a DOCS-based BCA schema, similar to the DDL commands described earlier for creating a BC schema. A DOCS-based BCA schema may be stored in one or more collections. DOCS-based BCA schema changes are propagated and coordinated between the DOCS-based BCA participants similar to as described in FIG. 7, using blocks similar to DDL blocks and DDL administration blocks described earlier, except that these blocks identify an initiator DOCS rather than an initiator DBMS.

Finally, a DOCS is an extended version of a key-value storage system. However, in a key-value storage system, the value stored does not need to conform to a mark-up language. Nevertheless, a DOCS-based BCA network can include a key-value storage system as BCA participants.

Application to Non-Transaction Processing System

If a PSS does not support transactions on data, there are many ways to implement all-or-nothing properties of transaction processing. One approach uses an intentions list of idempotent operations to emulate a prepared transaction. Before deciding how to vote on a distributed transaction, operations are done on a copy of the relevant data. For example, creating a new file in a file system is done in a system-managed directory, and the hidden file is renamed appropriately when the distributed transaction commits. In Unix/Linux systems, renaming can be done by the "mv" command. Updating an existing file in a file system is done to a copy of the file in a system-managed directory, and the temporary file is used to overwrite the user file when the distributed transaction commits. In Unix/Linux systems, overwriting can be done by the "mv" command. Deleting a file is just an entry on the intentions list, and the user file is actually deleted if and when the transaction commits. If the distributed transaction aborts, each PSS discards the local intentions list associated with the distributed transaction as well as any temporary objects in the system-managed collection of objects. If the distributed transaction commits, each PSS applies the local intentions list associated with the distributed transaction and then discards that list. Crashes during apply may be handled by re-applying the local intentions list from the start. For large or costly distributed transactions, local checkpoints may be used to record progress and minimize the operations in the intentions list that are attempted multiple times.

Database Systems

A database management system (DBMS) manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/WL is a common extension of SQL used when manipulating XML data in an object-relational database.

Changes to a database in a DBMS are made using transaction processing. A database transaction is a set of operations that change database data. In a DBMS, a database transaction is initiated in response to database statement requesting a change, such as DML statement requesting as an update, insert of a row, or a delete of a row. Committing a transaction refers to making the changes for a transaction permanent.

Under transaction processing, all the changes for a transaction are made atomically. When a transaction is committed, either all changes are committed, or the transaction is rolled back. DML statements or commands refer to statements that specify to change data, such as INSERT and UPDATE statement. A DML statement or command does not refer to statement that merely queries database data.

In a distributed transaction, multiple DBMSs commit a distributed transaction using two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMS.

A two-phase commit involves two phases, the prepare-to-commit phase and the commit phase. In the prepare-to-commit phase, branch transaction is prepared in each of the participating database systems. When a branch transaction is prepared on a DBMS, the database is in "prepared state" such that it can guarantee that modifications executed as part of a branch transaction to the database data can be committed. This guarantee may entail storing change records for the branch transaction persistently. A participating DBMS acknowledges when it has completed the prepare-to-commit phase and has entered a prepared state for the respective branch transaction of the participating DBMS.

According to an embodiment, the prepare-to-commit phase includes adding a TC block to a blockchain, or log record containing a blockchain. Thus, a participating DBMS cannot enter the prepared state or acknowledge such until the TC block is added.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare, or the coordinating database system is unable to commit, then at least one of the database systems is unable to make the changes specified by the transaction. In this case, all of the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue the series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e. can be created or terminated by the database server) and perform various database server functions. Database processes include processes running within a database session established for a client.

A database process is a unit of execution. A database process can be an computer system process or thread or a user defined execution context such as a user thread or fiber. Database processes may also include "database server system" processes which provide services and/or perform functions on behalf of entire database server. Such database server system processes include listeners, garbage collectors, log writers, and recovery processes.

A multi-node database management system is made up of interconnected nodes each running a database server that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

A database dictionary may comprise multiple data structures that store database metadata. A database dictionary may for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the column names and datatypes of the columns, and one or more files or portions thereof that store data for the table. Metadata in the database dictionary defining a procedure may specify a name of the procedure, the procedure's arguments and the return data type and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user defined function implemented in a JAVA class may be defined in part by the database dictionary by specifying the name of the users defined function and by specifying a reference to a file containing the source code of the Java class (i.e. .java file) and the compiled version of the class (i.e. .class file).

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
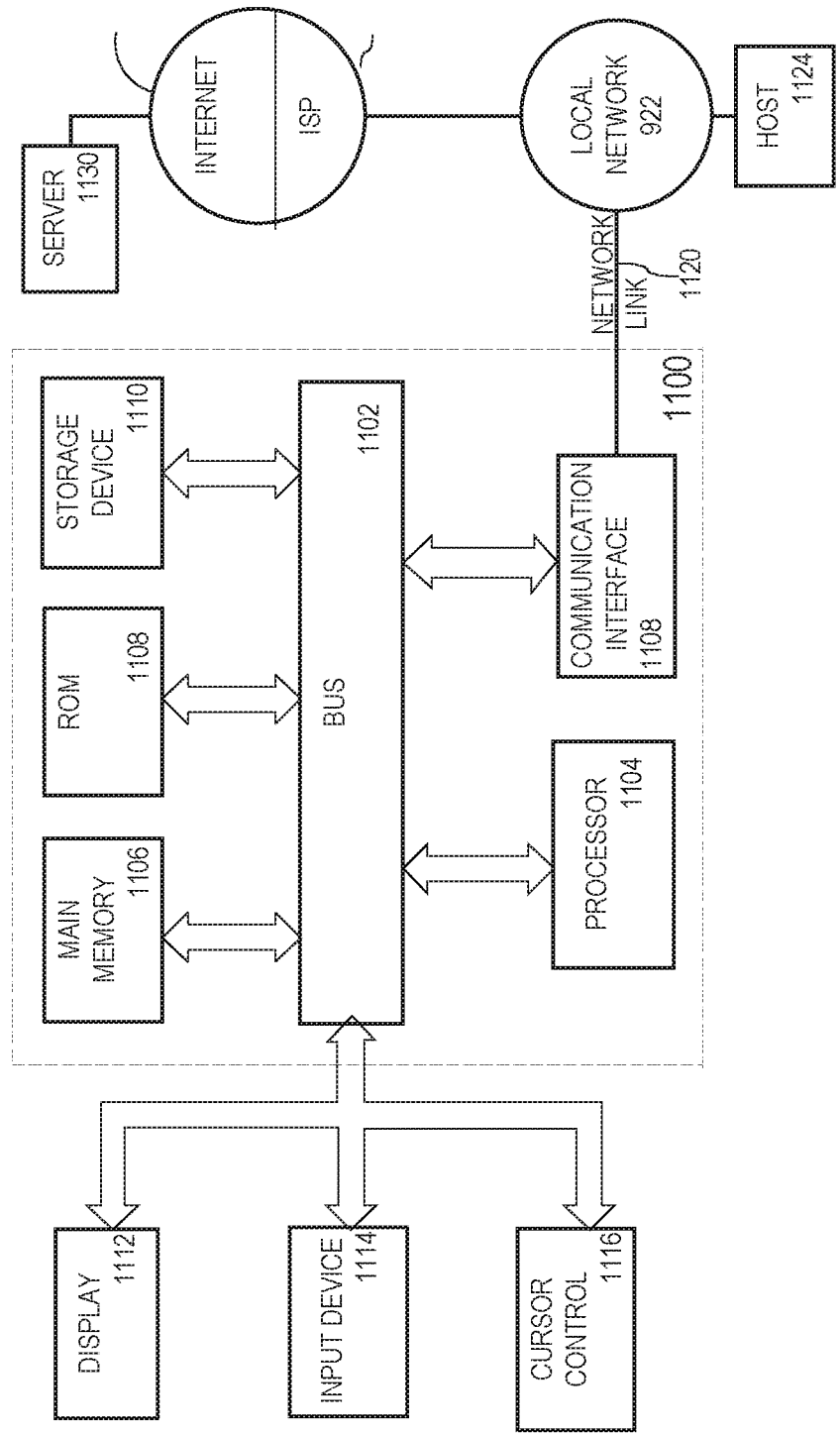
FIG. 11 is a diagram depicting a computer system that may be used to implement an embodiment of the present invention.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk, optical disk, or solid-state drive is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1110. Volatile media includes dynamic memory, such as main memory 1106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid-state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Software Overview

Figure 12:
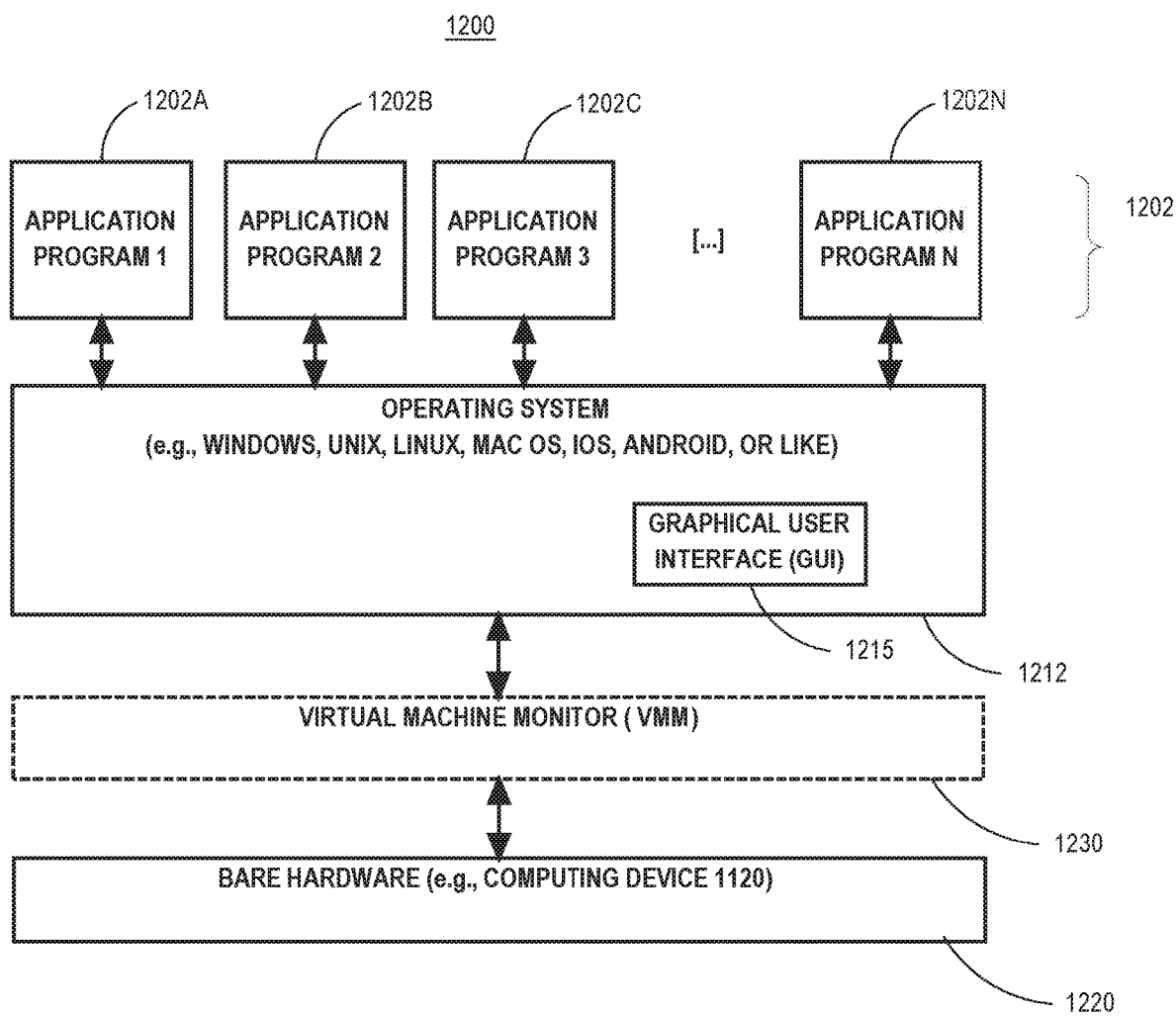
FIG. 12 depicts a software system that may be employed for controlling the operation of a computer system according to an embodiment of the present invention.

FIG. 12 is a block diagram of a basic software system 1200 that may be employed for controlling the operation of computer system 1100. Software system 1200 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1200 is provided for directing the operation of computer system 1100. Software system 1200, which may be stored in system memory (RAM) 1106 and on fixed storage (e.g., hard disk or flash memory) 1110, includes a kernel or operating system (OS) 1210.

The OS 1210 manages low-level aspects of computer operation, including managing execution of processes, memory allocation, file input and output (I/O), and device I/O. One or more application programs, represented as 1202A, 1202B, 1202C . . . 1202N, may be "loaded" (e.g., transferred from fixed storage 1110 into memory 1106) for execution by the system 1200. The applications or other software intended for use on computer system 1100 may also be stored as a set of downloadable computer-executable instructions, for example, for downloading and installation from an Internet location (e.g., a Web server, an app store, or other online service).

Software system 1200 includes a graphical user interface (GUI) 1215, for receiving user commands and data in a graphical (e.g., "point-and-click" or "touch gesture") fashion. These inputs, in turn, may be acted upon by the system 1200 in accordance with instructions from operating system 1210 and/or application(s) 1202. The GUI 1215 also serves to display the results of operation from the OS 1210 and application(s) 1202, whereupon the user may supply additional inputs or terminate the session (e.g., log off).

OS 1210 can execute directly on the bare hardware 1220 (e.g., processor(s) 1104) of computer system 1100. Alternatively, a hypervisor or virtual machine monitor (VMM) 1230 may be interposed between the bare hardware 1220 and the OS 1210. In this configuration, VMM 1230 acts as a software "cushion" or virtualization layer between the OS 1210 and the bare hardware 1220 of the computer system 1100.

VMM 1230 instantiates and runs one or more virtual machine instances ("guest machines"). Each guest machine comprises a "guest" operating system, such as OS 1210, and one or more applications, such as application(s) 1202, designed to execute on the guest operating system. The VMM 1230 presents the guest operating systems with a virtual operating platform and manages the execution of the guest operating systems.

In some instances, the VMM 1230 may allow a guest operating system to run as if it is running on the bare hardware 1220 of computer system 1100 directly. In these instances, the same version of the guest operating system configured to execute on the bare hardware 1220 directly may also execute on VMM 1230 without modification or reconfiguration. In other words, VMM 1230 may provide full hardware and CPU virtualization to a guest operating system in some instances.

In other instances, a guest operating system may be specially designed or configured to execute on VMM 1230 for efficiency. In these instances, the guest operating system is "aware" that it executes on a virtual machine monitor. In other words, VMM 1230 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

What is claimed is:

1. A method, comprising:
a particular Blockchain Apply ("BCA") participant of a BCA network receiving a request to commit a particular transaction to a ledgered repository object stored in a persistent storage system, said particular transaction including one or more operations performed against said ledgered repository object;
wherein said BCA network comprises a plurality of BCA participants that include said particular BCA participant and a plurality of other BCA participants, wherein each BCA participant of said plurality of BCA participants includes:
a respective ledgered repository object replica of said ledgered repository object;
a respective Blockchain ("BC") log replica of a BC log that stores a blockchain, said respective BC log replica storing a respective blockchain replica of said blockchain;
in response to receiving said request to commit said particular transaction:
initiating a first distributed transaction against said ledgered repository object;
said particular BCA participant sending a first proposal to said plurality of other BCA participants to add a first log record to said BC log, wherein said first log record includes a first block to add to said blockchain, said first block describing said one or more operations;
determining a consensus outcome of said BCA network for said first proposal is acceptance;
in response to determining that said consensus outcome for said first proposal is acceptance, modifying the respective BC log replica of said particular BCA participant to add a first log record replica of said first log record to the respective BC log;
after modifying the respective BC log replica of said particular BCA participant to add a first log record replica, determining that a consensus outcome by said BCA network to commit said first distributed transaction is acceptance; and
based on the consensus outcome by said BCA network to commit said first distributed transaction, coordinating committing said first distributed transaction.

2. The method of claim 1, wherein said first block includes a particular transaction context that specifies said one or more operations and a particular write set generated by said particular transaction.

3. The method of claim 2, further including:
said particular BCA participant sending a second proposal to add a second log record to said BC log that includes a second block to add to said blockchain, said second block including content indicating that the consensus outcome by said BCA network to commit said first distributed transaction is acceptance;
said particular BCA participant determining a second consensus outcome of said BCA network for said second proposal is acceptance; and
in response to determining that said consensus outcome for said second proposal is acceptance, modifying the respective BC log replica of said particular BCA participant to add a second log record replica of said second log record to the respective BC log.

4. The method of claim 1, wherein each BCA participant of said plurality of BCA participants includes:
a respective BC schema that defines the respective ledgered repository object replica and respective BC log replica of said each BCA participant; and
wherein the respective blockchain replica of said each BCA participant includes one or more blocks that specify DDL operations to define said respective BC schema.

5. The method of claim 4, wherein the respective BC schema of said each BCA participant of said plurality of BCA participants defines a blockchain procedure, wherein said particular transaction includes execution of said blockchain procedure.

6. The method of claim 4, further including:
said particular BCA participant making a pending DDL change to the respective BC schema of said particular BCA participant;
said particular BCA participant sending a second proposal to said plurality of other BCA participants to add a second log record to said BC log, wherein said second log record includes a second block to add to said blockchain, said second block specifying the DDL change;
said particular BCA participant determining a consensus outcome of said BCA network for said second proposal is acceptance;
in response to determining that said consensus outcome for said second proposal is acceptance, modifying the respective BC log replica of said particular BCA participant to add a second log record replica of said second log record to the respective BC log of said particular BCA participant;
determining a consensus outcome by said BCA network for said DDL change is acceptance; and
based on the consensus outcome by said BCA network for said DDL change, activating said DDL change to said respective BC schema of said particular BCA participant.

7. The method of claim 6, wherein making a pending DDL change to the respective BC schema of said particular BCA participant includes creating an epoch of said respective BC schema.

8. The method of claim 1, further including:
said particular BCA participant adding a second log record to the respective BC log of said particular BCA participant, wherein said second log record includes a second block to add to said blockchain, said second block including a second transaction context that specifies operations performed by a second transaction executed by another BCA participant of said plurality of other BCA participants and a second write set generated by said second transaction, said second transaction being a branch transaction of a second distributed transaction initiated by said another BCA participant;
said particular BCA participant executing a local transaction as a branch transaction of said second distributed transaction thereby generating a local write set;
said particular BCA participant making a comparison of said second write set and said local write set; and
based on the comparison, determining to vote to commit said second distributed transaction.

9. The method of claim 8, wherein executing said local transaction includes multiple slave processes executing said branch transaction.

10. The method of claim 4, further including:
said particular BCA participant adding a second log record to the respective BC log of said particular BCA participant, wherein said second log record includes a second block to add to said blockchain, said second block including a second transaction context that specifies operations performed by a second transaction executed by another BCA participant of said plurality of other BCA participants and a second write set generated by said second transaction, said second transaction being a branch transaction of a second distributed transaction initiated by said another BCA participant;
said particular BCA participant executing a procedure defined by a private schema within said respective BC schema of said particular BCA participant; and
based on a result returned by executing said procedure, determining to vote to commit said second distributed transaction.

11. The method of claim 10, further including:
said particular BCA participant adding a third log record to the respective BC log replica of said particular BCA participant, wherein said third log record includes a third block to add to said blockchain, said third block specifying the consensus outcome by said BCA network to commit said second distributed transaction is acceptance; and
based on said third block specifying the consensus outcome by said BCA network to commit said second distributed transaction, said particular BCA participant committing a branch transaction of said second distributed transaction.

12. The method of claim 1, wherein:
said particular BCA participant is assigned an initiator role and each other BCA participant of said plurality of other BCA participants is assigned a follower role;
wherein for a given period of time of a plurality of periods of time, only one particular BCA participant of said plurality of BCA participants serves in the initiator role; and
wherein during said plurality of periods of time, only a BCA participant assigned the initiator role may propose to add a block to the BC log chain.

13. The method of claim 12, the method including:
during said plurality of periods of time and when another BCA participant of said plurality of other BCA participants is assigned the initiator role:
said particular BCA participant determining that a particular block said particular BCA participant had proposed is pending; and
in response to said particular BCA participant determining that a block that said particular BCA participant had proposed is pending, sending a request to said another BCA participant to propose a block based on the particular block.

14. The method of claim 1, wherein a particular BCA participant of said plurality of BCA participants is either a database management system, a file system, a document storage system, or a key-value pair storage system.

15. One or more non-transitory computer-readable media storing one or more sequences of instructions which, when executed by one or more processors, cause:
a particular Blockchain Apply ("BCA") participant of a BCA network receiving a request to commit a particular transaction to a ledgered repository object stored in a persistent storage system, said particular transaction including one or more operations performed against said ledgered repository object;
wherein said BCA network comprises a plurality of BCA participants that include said particular BCA participant and a plurality of other BCA participants, wherein each BCA participant of said plurality of BCA participants includes:
a respective ledgered repository object replica of said ledgered repository object;
a respective Blockchain ("BC") log replica of a BC log that stores a blockchain, said respective BC log replica storing a respective blockchain replica of said blockchain;
in response to receiving said request to commit said particular transaction:
initiating a first distributed transaction against said ledgered repository object;
said particular BCA participant sending a first proposal to said plurality of other BCA participants to add a first log record to said BC log, wherein said first log record includes a first block to add to said blockchain, said first block describing said one or more operations;
determining a consensus outcome of said BCA network for said first proposal is acceptance;
in response to determining that said consensus outcome for said first proposal is acceptance, modifying the respective BC log replica of said particular BCA participant to add a first log record replica of said first log record to the respective BC log;
after modifying the respective BC log replica of said particular BCA participant to add a first log record replica, determining that a consensus outcome by said BCA network to commit said first distributed transaction is acceptance; and
based on the consensus outcome by said BCA network to commit said first distributed transaction, coordinating committing said first distributed transaction.

16. The one or more non-transitory computer-readable media of claim 15, wherein said first block includes a particular transaction context that specifies said one or more operations and a particular write set generated by said particular transaction.

17. The one or more non-transitory computer-readable media of claim 16, wherein said one or more sequences of instructions include instructions that, when executed by one or more processors, cause:
said particular BCA participant sending a second proposal to add a second log record to said BC log that includes a second block to add to said blockchain, said second block including content indicating that the consensus outcome by said BCA network to commit said first distributed transaction is acceptance;
said particular BCA participant determining a second consensus outcome of said BCA network for said second proposal is acceptance; and
in response to determining that said consensus outcome for said second proposal is acceptance, modifying the respective BC log replica of said particular BCA participant to add a second log record replica of said second log record to the respective BC log.

18. The one or more non-transitory computer-readable media of claim 15, wherein each BCA participant of said plurality of BCA participants includes:
a respective BC schema that defines the respective ledgered repository object replica and respective BC log replica of said each BCA participant; and
wherein the respective blockchain replica of said each BCA participant includes one or more blocks that specify DDL operations to define said respective BC schema.

19. The one or more non-transitory computer-readable media of claim 18, wherein the respective BC schema of said each BCA participant of said plurality of BCA participants defines a blockchain procedure, wherein said particular transaction includes execution of said blockchain procedure.

20. The one or more non-transitory computer-readable media of claim 18, wherein said one or more sequences of instructions include instructions that, when executed by one or more processors, cause:
said particular BCA participant making a pending DDL change to the respective BC schema of said particular BCA participant;
said particular BCA participant sending a second proposal to said plurality of other BCA participants to add a second log record to said BC log, wherein said second log record includes a second block to add to said blockchain, said second block specifying the DDL change;
said particular BCA participant determining a consensus outcome of said BCA network for said second proposal is acceptance;
in response to determining that said consensus outcome for said second proposal is acceptance, modifying the respective BC log replica of said particular BCA participant to add a second log record replica of said second log record to the respective BC log of said particular BCA participant;
determining a consensus outcome by said BCA network for said DDL change is acceptance; and
based on the consensus outcome by said BCA network for said DDL change, activating said DDL change to said respective BC schema of said particular BCA participant.

21. The one or more non-transitory computer-readable media of claim 20, wherein making a pending DDL change to the respective BC schema of said particular BCA participant includes creating an epoch of said respective BC schema.

22. The one or more non-transitory computer-readable media of claim 15, wherein said one or more sequences of instructions include instructions that, when executed by one or more processors, cause:
said particular BCA participant adding a second log record to the respective BC log of said particular BCA participant, wherein said second log record includes a second block to add to said blockchain, said second block including a second transaction context that specifies operations performed by a second transaction executed by another BCA participant of said plurality of other BCA participants and a second write set generated by said second transaction, said second transaction being a branch transaction of a second distributed transaction initiated by said another BCA participant;
said particular BCA participant executing a local transaction as a branch transaction of said second distributed transaction thereby generating a local write set;
said particular BCA participant making a comparison of said second write set and said local write set; and
based on the comparison, determining to vote to commit said second distributed transaction.

23. The one or more non-transitory computer-readable media of claim 22, wherein executing said local transaction includes multiple slave processes executing said branch transaction.

24. The one or more non-transitory computer-readable media of claim 18, wherein said one or more sequences of instructions include instructions that, when executed by one or more processors, cause:
said particular BCA participant adding a second log record to the respective BC log of said particular BCA participant, wherein said second log record includes a second block to add to said blockchain, said second block including a second transaction context that specifies operations performed by a second transaction executed by another BCA participant of said plurality of other BCA participants and a second write set generated by said second transaction, said second transaction being a branch transaction of a second distributed transaction initiated by said another BCA participant;
said particular BCA participant executing a procedure defined by a private schema within said respective BC schema of said particular BCA participant; and
based on a result returned by executing said procedure, determining to vote to commit said second distributed transaction.

25. The one or more non-transitory computer-readable media of claim 24, wherein said one or more sequences of instructions include instructions that, when executed by one or more processors, cause:
said particular BCA participant adding a third log record to the respective BC log replica of said particular BCA participant, wherein said third log record includes a third block to add to said blockchain, said third block specifying the consensus outcome by said BCA network to commit said second distributed transaction is acceptance; and
based on said third block specifying the consensus outcome by said BCA network to commit said second distributed transaction, said particular BCA participant committing a branch transaction of said second distributed transaction.

26. The one or more non-transitory computer-readable media of claim 15, wherein:
- said particular BCA participant is assigned an initiator role and each other BCA participant of said plurality of other BCA participants is assigned a follower role;
- wherein for a given period of time of a plurality of periods of time, only one particular BCA participant of said plurality of BCA participants serves in the initiator role; and
- wherein during said plurality of periods of time, only a BCA participant assigned the initiator role may propose to add a block to the BC log chain.

27. The one or more non-transitory computer-readable media of claim 26, wherein said one or more sequences of instructions include instructions that, when executed by one or more processors, cause:
- during said plurality of periods of time and when another BCA participant of said plurality of other BCA participants is assigned the initiator role:
  - said particular BCA participant determining that a particular block said particular BCA participant had proposed is pending; and
  - in response to said particular BCA participant determining that a block that said particular BCA participant had proposed is pending, sending a request to said another BCA participant to propose a block based on the particular block.

28. The one or more non-transitory computer-readable media of claim 15, wherein a particular BCA participant of said plurality of BCA participants is either a database management system, a file system, a document storage system, or a key-value pair storage system.

\* \* \* \* \*